(12) United States Patent
Choi et al.

(10) Patent No.: US 12,744,040 B2
(45) Date of Patent: Sep. 22, 2026

(54) METHOD FOR PROCESSING MISRECOGNIZED AUDIO SIGNALS, AND DEVICE THEREFOR

(71) Applicant: SAMSUNG ELECTRONICS CO., LTD., Suwon-si (KR)

(72) Inventors: Chanhee Choi, Suwon-si (KR); Chansik Bok, Suwon-si (KR); Hyundon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 18/737,673

(22) Filed: Jun. 7, 2024

(65) Prior Publication Data

US 2024/0331696 A1 Oct. 3, 2024

Related U.S. Application Data

(63) Continuation of application No. PCT/KR2022/018196, filed on Nov. 17, 2022.

(30) Foreign Application Priority Data

Dec. 10, 2021 (KR) ........................ 10-2021-0176941

(51) Int. Cl.
*G10L 15/22* (2006.01)
*G06F 3/16* (2006.01)
(Continued)

(52) U.S. Cl.
CPC .............. *G10L 15/22* (2013.01); *G10L 21/02* (2013.01); *G10L 2015/223* (2013.01); *G10L 2015/225* (2013.01)

(58) Field of Classification Search
CPC ............... G10L 2015/223; G10L 15/00; G10L 15/1815; G10L 15/16; G10L 15/02;
(Continued)

(56) References Cited

U.S. PATENT DOCUMENTS 9,484,029 B2 11/2016 Jung et al.
9,691,378 B1 * 6/2017 Meyers .................. G10L 15/04
(Continued)

FOREIGN PATENT DOCUMENTS

CN 113160802 A * 7/2021 ........... G10L 15/063
CN 113727157 A 11/2021
(Continued)

OTHER PUBLICATIONS

International Search Report (PCT/ISA/210) issued Feb. 22, 2023 by the International Searching Authority in the International Patent Application No. PCT/KR2022/018196.
(Continued)

*Primary Examiner* — Leshui Zhang
(74) *Attorney, Agent, or Firm* — Sughrue Mion, PLLC

(57) ABSTRACT

A method, an electronic device, and a non-transitory computer-readable medium storing instructions may be provided. The method may include receiving an audio signal; based on at least one preset trigger word being included in the received audio signal, determining whether the at least one trigger word included in the audio signal is misrecognized; based on the determining that the at least one preset trigger word is misrecognized, requesting an additional input from a user; and based on the additional input received in response to the request and the audio signal, executing a function corresponding to audio recognition.

15 Claims, 15 Drawing Sheets

(51) Int. Cl.

| | |
|---|---|
| ***G10L 15/01*** | (2013.01) |
| ***G10L 17/24*** | (2013.01) |
| ***G10L 21/02*** | (2013.01) |

(58) Field of Classification Search

CPC ......... G10L 25/51; G10L 17/00; G10L 15/32; G10L 2015/225; G10L 15/01; G10L 15/183; G10L 15/22; G10L 15/08; G10L 15/26; G10L 15/04; G10L 15/18; G10L 15/063; G10L 15/1822; G10L 21/02; G10L 21/32; G10L 17/24; G06F 3/16; G06F 3/167; G06F 3/0481

USPC ................ 704/251, 252, 239, 240, 246, 247

See application file for complete search history.

(56) References Cited

U.S. PATENT DOCUMENTS

| | | | | |
|---|---|---|---|---|
| 10,056,081 | B2 | 8/2018 | Kunitake et al. | |
| 10,867,600 | B2 | 12/2020 | Gruenstein et al. | |
| 11,164,565 | B2 | 11/2021 | Lee | |
| 11,417,327 | B2 | 8/2022 | Choi | |
| 11,450,315 | B2 | 9/2022 | Kim et al. | |
| 2009/0326944 | A1* | 12/2009 | Yano | G10L 15/22 704/E15.001 |
| 2018/0211661 | A1 | 7/2018 | Kudo et al. | |
| 2020/0043492 | A1 | 2/2020 | Kim et al. | |
| 2021/0335347 | A1 | 10/2021 | Kim et al. | |

FOREIGN PATENT DOCUMENTS

| | | | | | |
|---|---|---|---|---|---|
| EP | 3 404 655 | B1 | | 9/2020 | |
| JP | 2006-251298 | A | | 9/2006 | |
| JP | 2008-51895 | A | | 3/2008 | |
| JP | 2017-117371 | A | | 6/2017 | |
| JP | 6351440 | B2 | | 7/2018 | |
| JP | 2019-32387 | A | | 2/2019 | |
| JP | 2019032387 | A | * | 2/2019 | |
| KR | 10-2001-0083494 | A | | 9/2001 | |
| KR | 10-2012-0110392 | A | | 10/2012 | |
| KR | 20120110392 | A | * | 10/2012 | G10L 15/22 |
| KR | 10-2014-0035164 | A | | 3/2014 | |
| KR | 10-2016-0097788 | A | | 8/2016 | |
| KR | 10-2018-0084392 | A | | 7/2018 | |
| KR | 10-2019-0065199 | A | | 6/2019 | |
| KR | 10-2093851 | B1 | | 3/2020 | |
| KR | 10-2020-0063521 | A | | 6/2020 | |
| KR | 10-2112564 | B1 | | 6/2020 | |
| KR | 10-2020-0141126 | A | | 12/2020 | |
| KR | 10-2246900 | B1 | | 4/2021 | |
| KR | 10-2281590 | B1 | | 7/2021 | |

OTHER PUBLICATIONS

Written Opinion (PCT/ISA/237) issued Feb. 22, 2023 by the International Searching Authority in the International Patent Application No. PCT/KR2022/018196.

Joe Wang et al., "An Audio-Based Wakeword-Independent Verification System", Proceedings of Interspeech 2020, Oct. 2020, 5 pages.

Communication issued on Jan. 30, 2026 by the Korean Ministry of Intellectual Property (MOIP) in Korean Patent Application No. 10-2021-0176941.

* cited by examiner

Figure 3:
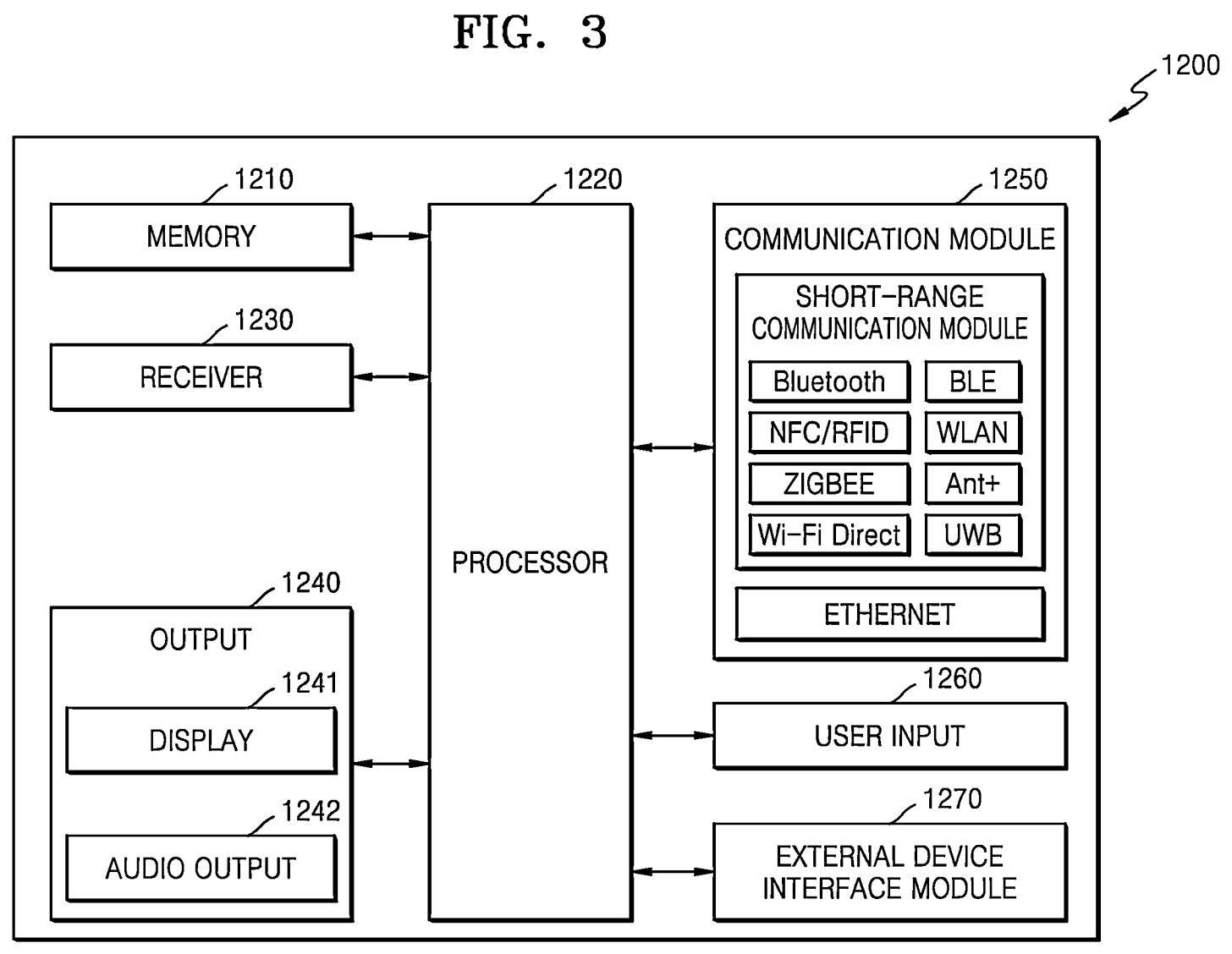

1250 COMMUNICATION MODULE

SHORT-RANGE COMMUNICATION MODULE

Bluetooth

BLE

NFC/RFID

WLAN

ZIGBEE

Ant+

Wi-Fi Direct

UWB

ETHERNET

1260 USER INPUT

1270 EXTERNAL DEVICE INTERFACE MODULE

1220 PROCESSOR

1210 MEMORY

1230 RECEIVER

1240 OUTPUT

1241 DISPLAY

1242 AUDIO OUTPUT

FIG. 6

1610
BIXBY, SWITCH INTO POWER SAVING MODE

1100

1611
15:15:00

1614
NO NEED FOR ADDITIONAL INPUT

1200

1660
WHAT IS BIXBYITE?

1661
16:15:00

1664
NEED FOR ADDITIONAL INPUT

1630

1650 1640

| AUDIO RECOGNITION CONTENT INFORMATION | TIME INFORMATION |
|---|---|
| SWITCH INTO ACTIVE MODE | 15:12:05 |
| CHANGE TO CHANNEL 9 | 15:12:10 |
| VOLUME UP | 15:12:20 |

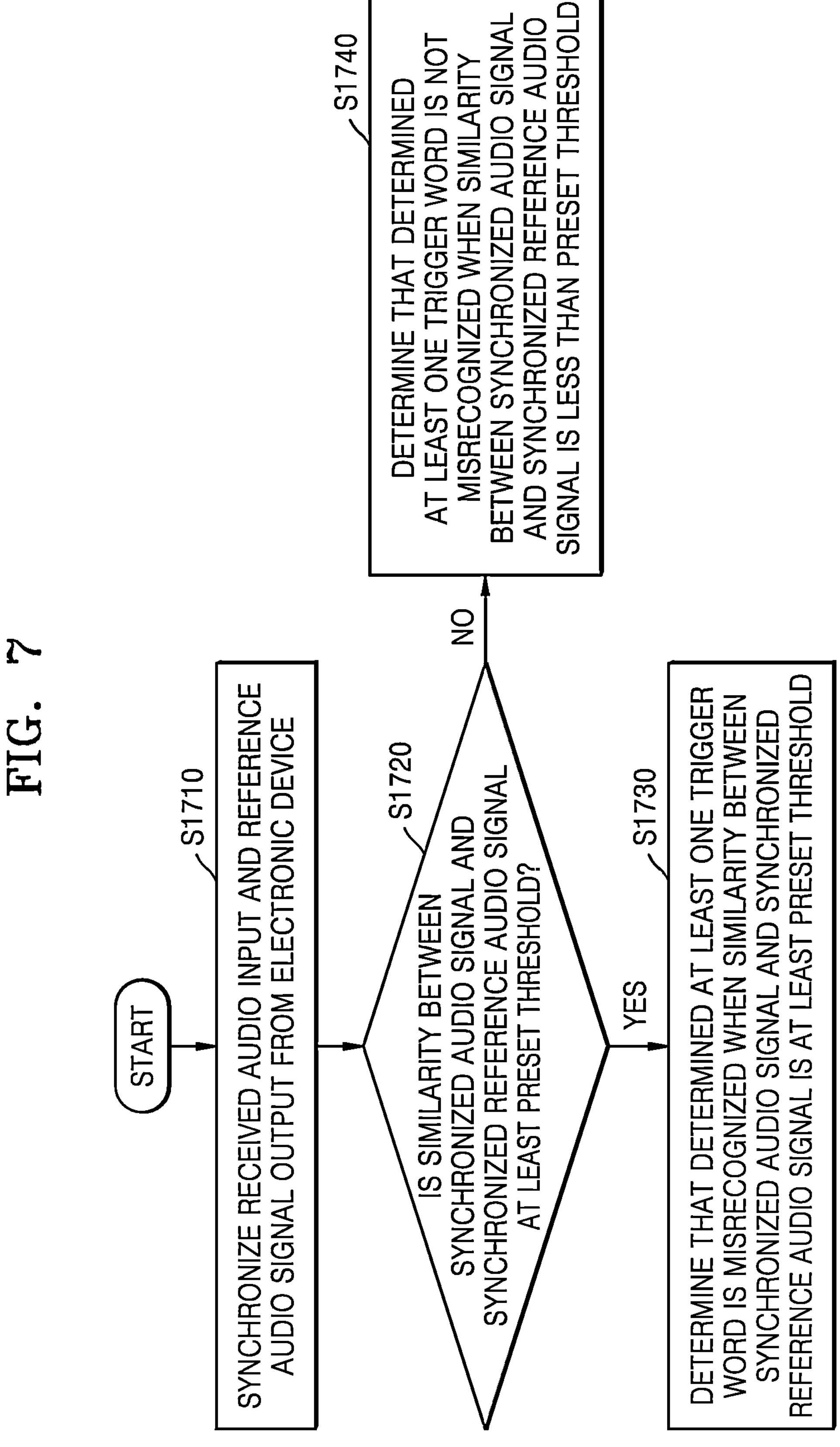
FIG. 7
START
S1710
SYNCHRONIZE RECEIVED AUDIO INPUT AND REFERENCE AUDIO SIGNAL OUTPUT FROM ELECTRONIC DEVICE
S1720
IS SIMILARITY BETWEEN SYNCHRONIZED AUDIO SIGNAL AND SYNCHRONIZED REFERENCE AUDIO SIGNAL AT LEAST PRESET THRESHOLD?
YES
S1730
DETERMINE THAT DETERMINED AT LEAST ONE TRIGGER WORD IS MISRECOGNIZED WHEN SIMILARITY BETWEEN SYNCHRONIZED AUDIO SIGNAL AND SYNCHRONIZED REFERENCE AUDIO SIGNAL IS AT LEAST PRESET THRESHOLD
NO
S1740
DETERMINE THAT DETERMINED AT LEAST ONE TRIGGER WORD IS NOT MISRECOGNIZED WHEN SIMILARITY BETWEEN SYNCHRONIZED AUDIO SIGNAL AND SYNCHRONIZED REFERENCE AUDIO SIGNAL IS LESS THAN PRESET THRESHOLD 2131
2132
2133
I'M GOING TO STOP WATCHING THE MOVIE
BIXBY
SWITCH INTO POWER SAVING MODE
2110
I'M GOING TO STOP WATCHING THE MOVIE. BIXBY! SWITCH INTO POWER SAVING MODE
1100
2120
1200
2200
ADDITIONAL INPUT
IF YOU ASKED TO SWITCH INTO POWER SAVING MODE, SAY YES
2210
INPUT SIGNAL: SWITCH INTO POWER SAVING MODE

Figure 14:
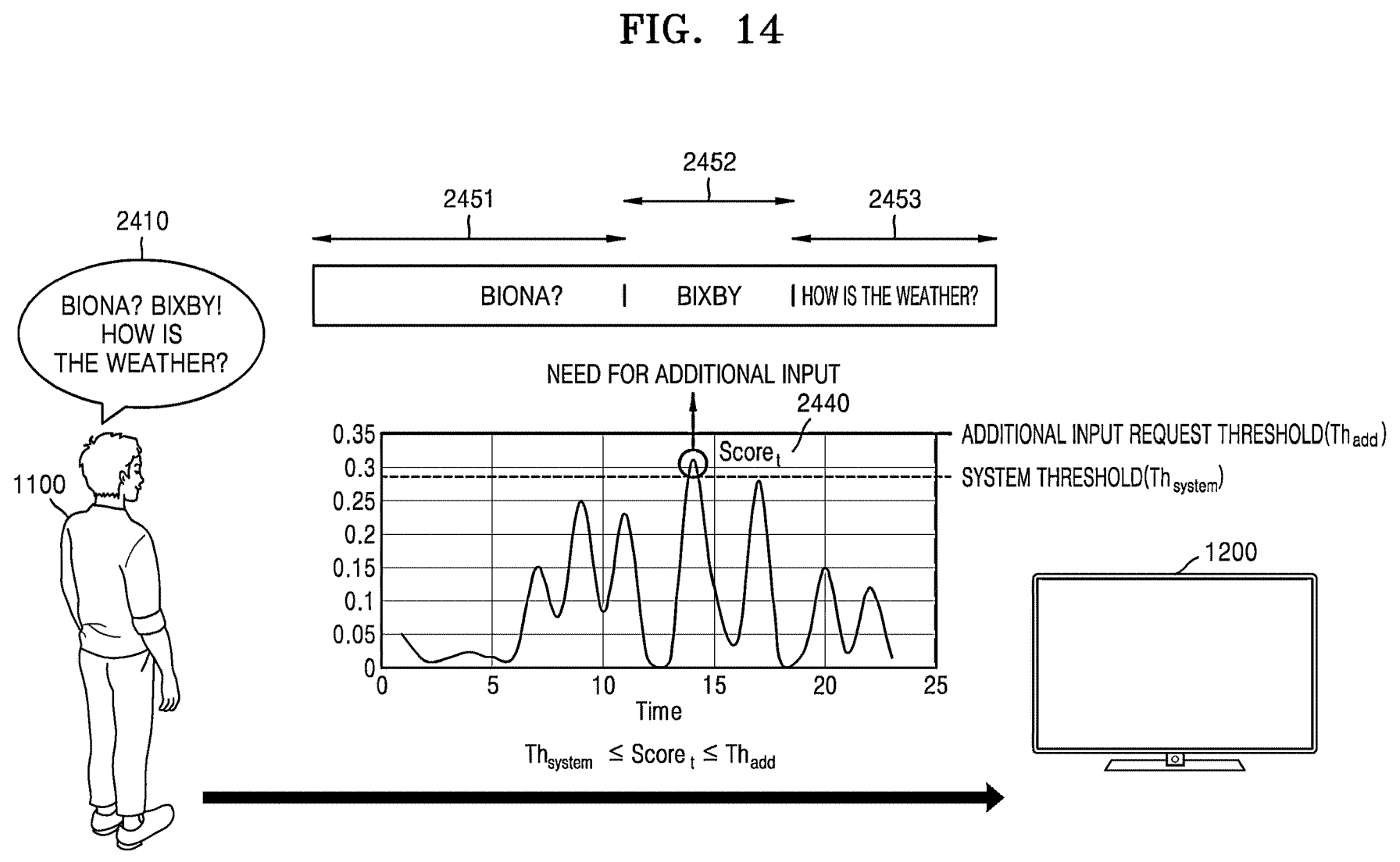

2410
BIONA? BIXBY! HOW IS THE WEATHER?
1100
2451
2452
2453
BIONA? | BIXBY | HOW IS THE WEATHER?
NEED FOR ADDITIONAL INPUT
2440
$Score_t$
ADDITIONAL INPUT REQUEST THRESHOLD($Th_{add}$)
SYSTEM THRESHOLD($Th_{system}$)
0.35
0.3
0.25
0.2
0.15
0.1
0.05
0
0
5
10
15
20
25
Time
$Th_{system} \leq Score_t \leq Th_{add}$
1200

FIG. 15

| NASAL SOUND | FRICATIVE SOUND | EXPLOSIVE SOUND |
|---|---|---|
| ㄴ, ㅁ, ㅇ | ㅅ, ㅆ, ㅎ | ㄱ, ㅋ, ㄸ, ㅃ, ㅂ |

METHOD FOR PROCESSING MISRECOGNIZED AUDIO SIGNALS, AND DEVICE THEREFOR

CROSS-REFERENCES TO RELATED APPLICATIONS

This application is a continuation of International Application No. PCT/KR2022/018196, filed on Nov. 17, 2022, at the Korea Intellectual Property Office, which claims priority from Korean Patent Application No. 10-2021-0176941, filed on Dec. 10, 2021, at the Korean Intellectual Property Office, the disclosure of which are incorporated herein in their entireties.

TECHNICAL FIELD

Embodiments of the disclosure relate to a method of processing a misrecognized audio signal and a device therefor.

BACKGROUND

Audio recognition is a technology that recognizes a user's voice by receiving and automatically converting it to text. The audio recognition has recently been used as an interface technique to replace keyboard inputs for smart phones or TVs.

There are two main methods of starting the audio recognition. The first one may execute a function corresponding to the audio recognition by activating a button or a separate device for starting the audio recognition. The second one may execute the function corresponding to the audio recognition after recognizing a trigger word uttered by the user. However, in determining whether the user's utterance corresponds to the trigger word, there are chances of misrecognition and the misrecognition situation may not be completely prevented.

SUMMARY

According to an aspect of the disclosure, a method of processing a misrecognized audio signal may be provided. The method may include receiving an audio signal; based on at least one preset trigger word being included in the received audio signal, determining whether the at least one trigger word included in the audio signal is misrecognized; based on the determining that the at least one preset trigger word is misrecognized, requesting an additional input from a user; and based on the additional input received in response to the request and the audio signal, executing a function corresponding to audio recognition.

According to an aspect of the disclosure, an electronic device for processing a misrecognized audio signal may be provided. The electronic device may include a memory storing one or more instructions; and at least one processor configured to execute the one or more instructions. The one or more processors may be configured to, based on at least one preset trigger word being included in a received audio signal, determine whether the at least one preset trigger word included in the received audio signal is misrecognized, based on the determining that the at least one preset trigger word is misrecognized, request an additional input from a user, and based on the received audio signal and the additional input received in response to the request, execute a function corresponding to audio recognition.

According to an aspect of the disclosure, a non-transitory computer-readable medium storing instructions may be provided. The instructions, when executed by a processor, may cause the processor to receive an audio signal; based on at least one preset trigger word being included in the received audio signal, determine whether the at least one preset trigger word included in the audio signal is misrecognized; based on the determining that the at least one preset trigger word is misrecognized, request an additional input from a user; and based on the audio signal and the additional input from the user received in response to the request, execute a function corresponding to audio recognition.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a diagram illustrating a method of processing a misrecognized audio signal, according to an embodiment.

FIG. 3 is a block diagram of an electronic device for processing a misrecognized audio signal, according to an embodiment of the disclosure.

FIG. 6 is a diagram illustrating a method of processing a misrecognized audio signal in detail, according to an embodiment of the disclosure.

FIG. 7 is a flowchart for processing a misrecognized audio signal, according to an embodiment of the disclosure.

FIG. 13 is a flowchart for processing a misrecognized audio signal, according to an embodiment of the disclosure.

FIG. 14 is a diagram illustrating a method for processing a misrecognized audio signal, according to an embodiment of the disclosure.

FIG. 15 is a diagram of an embodiment of additional inputs from a user according to FIG. 14.

DETAILED DESCRIPTION

Figure 2:
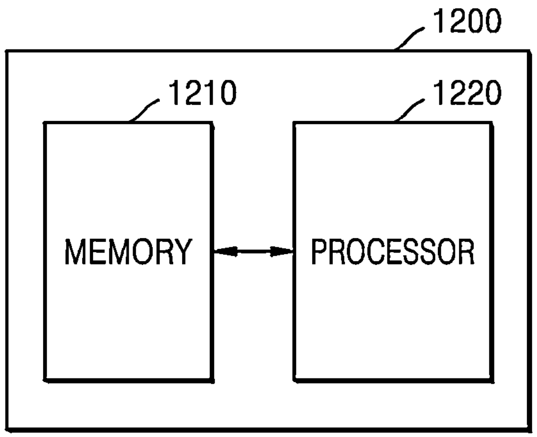
FIG. 2 is a block diagram of an electronic device for processing a misrecognized audio signal, according to an embodiment of the disclosure.

In a method according to an embodiment of the disclosure, determining of whether at least one trigger word included in an audio signal is misrecognized may include determining whether the at least one trigger word included in the audio signal is misrecognized based on history of execution of a function corresponding to audio recognition within a preset first time.

In the method according to an embodiment of the disclosure, the determining of whether the at least one trigger word included in the audio signal is misrecognized based on the history of execution of the function may include determining that the at least one trigger word included in the audio signal is misrecognized, when there is no history of execution of the function within the first time.

In the method according to an embodiment of the disclosure, the determining of whether the at least one trigger word included in the audio signal is misrecognized may include synchronizing the received audio signal and a reference audio signal output from an electronic device; and determining that the at least one trigger word included in the audio signal is misrecognized when similarity between the synchronized audio signal and the synchronized reference audio signal is at least preset first threshold.

In the method according to an embodiment of the disclosure, requesting of an additional input from a user may include adjusting intensity of the reference audio signal to a preset second threshold or less and requesting an additional input for the determined trigger word from the user.

In the method according to an embodiment of the disclosure, determining whether at least one trigger word included in an audio signal is misrecognized may include determining whether the at least one trigger word included in the audio signal is misrecognized, based on whether at least one input signal is included in the audio signal in addition to the at least one trigger word included in the audio signal.

In the method according to an embodiment of the disclosure, the requesting of the additional input from the user may include, requesting an additional input related to whether to perform at least one input signal from the user.

In the method according to an embodiment of the disclosure, the determining of whether the at least one trigger word included in the audio signal is misrecognized based on whether the at least one input signal is included in the audio signal may include dividing the audio signal into multiple sections except for a section corresponding to the at least one trigger word included in the audio signal; determining whether the at least one trigger word included in the audio signal is misrecognized based on at least one of energy values of the multiple sections and zero-crossing rates (ZCRs) of the multiple sections.

In the method according to an embodiment of the disclosure, determining whether at least one trigger word included in an audio signal is misrecognized may include measuring similarity between the preset at least one trigger word and the received audio signal; and determining that at least one trigger word with the measured similarity being at least third threshold is included in the audio signal.

In the method according to an embodiment of the disclosure, the determining of whether the at least one trigger word included in the audio signal is misrecognized may include determining that at least one trigger word with the measured similarity being smaller than a fourth threshold is misrecognized among the at least one trigger word with the measured similarity being at least the third threshold.

In the method according to an embodiment of the disclosure, the requesting of the additional input from the user may include, selecting a word different from the identified at least one trigger word; and requesting the selected word as an additional input from the user.

In the method according to an embodiment of the disclosure, the requesting of the additional input from the user may include, requesting the additional input from the user within a preset second time.

The method according to an embodiment of the disclosure may further include transmitting a control signal from a communication module of the electronic device to an external display device so that the external display device outputs a user interface (UI) related to the additional input, based on the determining of whether the misrecognition is made; and receiving, from the external display device, a response signal of the user in response to the control signal.

According to a second aspect of the disclosure, an electronic device for processing a misrecognized audio signal includes a memory storing one or more instructions; and at least one processor configured to execute the one or more instructions, wherein the at least one processor may be configured to, based on preset at least one trigger word included in a received audio signal, determine whether the at least one trigger word included in the audio signal is misrecognized, based on the determining of whether the misrecognition is made, request an additional input from a user, and based on the user's additional input received in response to the request and the audio signal, perform a function corresponding to audio recognition.

In an embodiment of the disclosure, the electronic device may further include a display, and the at least one processor may be configured to, based on the determining of whether the misrecognition is made, control the display to request the additional input from the user.

In an embodiment of the disclosure, the electronic device may further include a receiver, and the at least one processor may be configured to control the receiver to receive an audio signal.

In an embodiment of the disclosure, the electronic device may further include a communication module, and the at least one processor may be configured to control the communication module to receive an audio signal from an external electronic device which receives an audio signal.

According to a third aspect of the disclosure, a recording medium may include a computer-readable recording medium having a program recorded thereon, when executed by a computer, to perform the method.

Terms as used herein will be described before detailed descriptions of embodiments of the disclosure are provided.

The terms are selected as common terms that are currently widely used, taking into account principles of the disclosure, which may however depend on intentions of those of ordinary skill in the art, judicial precedents, emergence of new technologies, and the like. Some terms as used herein are selected at the applicant's discretion, in which case, the terms will be explained later in detail in connection with embodiments of the disclosure. Therefore, the terms should be defined based on their meanings and descriptions throughout the disclosure.

The term "include (or including)" or "comprise (or comprising)" is inclusive or open-ended and does not exclude additional, unrecited elements or method steps. The term "module" (or sometimes "unit") as herein used refers to software or a hardware component, such as FPGA or ASIC, which performs some functions. However, the unit is not limited to software or hardware. The module may be configured to be stored in an addressable storage medium, or to execute one or more processors. For example, the unit may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and units may be combined into a less number of components and units, or further divided into a more number of components and units.

An embodiment of the disclosure will now be described in detail with reference to accompanying drawings so as to be readily practiced by those of ordinary skill in the art. However, an embodiment of the disclosure may be implemented in many different forms, and is not limited to that discussed herein. In the drawings, parts unrelated to the description are omitted for clarity, and like numerals refer to like elements throughout the specification.

When A is said to "be connected" to B, it means to be "directly connected" to B or "electrically connected" to B with C located between A and C. The term "include (or including)" or "comprise (or comprising)" is inclusive or open-ended and does not exclude additional, unrecited elements or method steps, unless otherwise mentioned.

In the disclosure, the term "trigger word" may refer to a word that is a reference for determining the start of audio recognition. Based on similarity between the trigger word and a user's utterance, whether the user's utterance includes the trigger word may be determined. Specifically, based on an acoustic model trained with acoustic information, an electronic device or a server may determine the similarity between the trigger word and the user's utterance based on probability information regarding a degree of matching between the user's utterance and the acoustic model. The trigger word may include preset at least one trigger word. The trigger word may be a call word or an audio recognition start command. In the specification, the call word or the audio recognition start command may also be mentioned as the trigger word.

The disclosure will now be described with reference to accompanying drawings.

Figure 1:
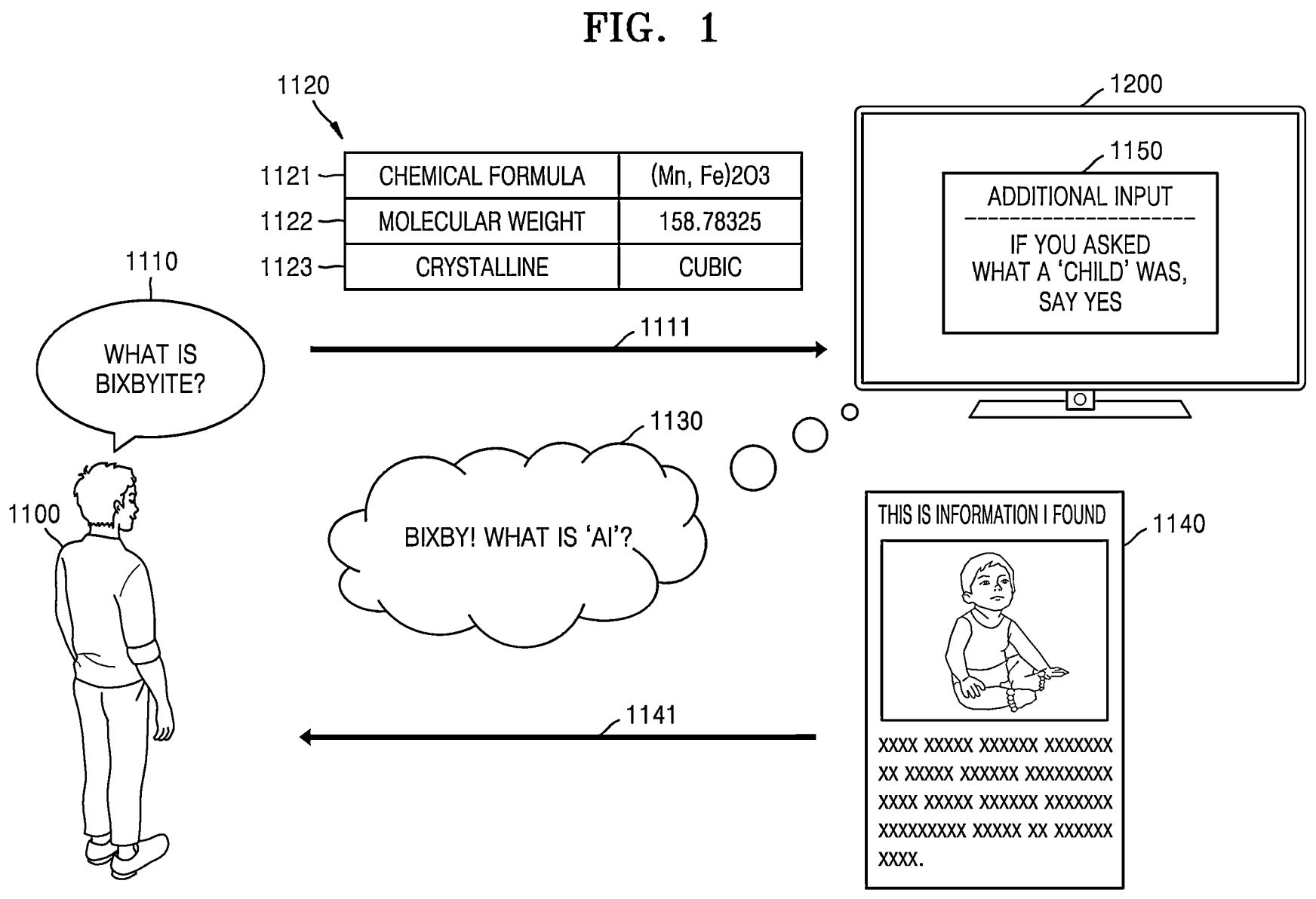

FIG. 1 is a diagram illustrating a method of processing a misrecognized audio signal, according to an embodiment.

In FIG. 1, shown are a user 1100 and an electronic device 1200 capable of audio recognition. Specifically, the electronic device 1200 may be an electronic device that processes a misrecognized audio signal (e.g., an incorrectly recognized audio signal, a misunderstood audio signal, a misinterpreted audio signal) by requesting an additional input corresponding to the misrecognized audio signal.

In an embodiment of the disclosure, the user 1100 may be located around the electronic device 1200 capable of audio recognition and may utter an audio signal 1110. As an example, when at least one trigger word is included in the received audio signal 1110 from the user 1000 (e.g., a preset trigger word), the electronic device 1200 may determine at least one trigger word is included in the audio signal 1110 of the user 1100 regardless of an intention of the user for audio recognition. Furthermore, when determining that the audio signal 1110 includes the at least one trigger word, the electronic device 1200 may determine whether the at least one trigger word is misrecognized.

For example, in an embodiment of the disclosure, the user 1100 may utter the audio signal 1110, "what is Bixbyite?". The Bixbyite may refer to a technical term regarding geology. An intention of the user 1100 regarding the audio signal 1110, "what is Bixbyite?", may be geology-related information 1120 including at least one of information indicating that chemical formula 1121 of the Bixbyite is (Mn, Fe) 203, information indicating that molecular weight 1122 of the Bixbyite is 158.78325 and information indicating that a crystal system 1123 of the Bixbyite is a cubic system.

Furthermore, in an embodiment of the disclosure, the Bixbyite and a trigger word related to audio recognition of the electronic device 1200 may have similar pronunciations. For example, at least one trigger word pre-stored in the electronic device 1200 may include 'Bixby'. Hence, as the Bixbyite and the Bixby of the at least one trigger word are perfectly matched in first three syllables, the processor of the electronic device 1200 may misrecognize the audio signal 1110 uttered by the user 1100, "what is Bixbyite?" as "what is, Bixby, I(ai)?" or "Bixby! What is 'I'?".

In an embodiment of the disclosure, the electronic device 1200 may request an additional input from the user 1100 based on determining of whether the misrecognition is made. Specifically, when the at least one trigger word included in the audio signal 1110 of the user 1100 is misrecognized, the electronic device 1200 may avoid a situation in which unnecessary audio recognition is started or performed by requesting an additional input regarding the misrecognition from the user 1100 instead of starting the audio recognition right away.

For example, when the electronic device does not handle the misrecognition of the audio signal 1110, "what is Bixbyite?" as "what is, Bixby, I?", the electronic device 1200 may output information 1140 about a child ('ai' in Korean) through a display of the electronic device or output an audio signal 1141 corresponding to the information 1140 about the child through an audio output. In this case, due to the misrecognition of the trigger word 'Bixby', the user 1100 may receive the information 1140 about a child, which is different from the geology-related information 1120 that the user 1100 wants to obtain. In other words, in this case, the user 1100 may obtain the information 1140 about a child instead of geology-related information that the user 1100 wants to obtain from the electronic device 1200.

In the example described with reference to FIG. 1, the electronic device 1200 may perform an operation of requesting an additional input 1150 of the user in response to the misrecognition of the trigger word. Specifically, the electronic device 1200 may perform the operation of requesting the additional input of the user in response to the misrecognition of 'Bixby' by outputting additional text "additional input: if you asked what a 'child was, please say yes". Furthermore, the electronic device 1200 may also perform an operation of requesting the additional input 1150 of the user by outputting an audio signal "if you asked what a 'child' was, please say yes", but the disclosure is not limited thereto.

In an embodiment of the disclosure, the electronic device 1200 may request an additional input from the user 1100 based on determining of whether the misrecognition is made. Based on the determining of whether the misrecognition is made, the electronic device 1200 may request additional input from the user within a preset time. Furthermore, the electronic device 1200 may execute a function corresponding to the audio recognition based on a suitable additional input received in response to the request and the received audio signal. In embodiments, when the user does not respond with any suitable additional input in response to the request or when the user rejects the additional input within the preset time, the electronic device 1200 may terminate the audio recognition on the audio signal.

In the embodiment of FIG. 1, as the request for the additional input 1150 output through the display of the electronic device 1200 is about what a 'child' ('ai' in Korean) is rather than about the 'Bixbyite', the user 1100 may not answer 'yes'. Specifically, the user 1100 may answer 'no' or reject answer to the request for an additional input within a preset first time. When the user answers 'no' or rejects answer within the preset first time in response to the request for the additional input, the electronic device 1200 may end the situation where unnecessary audio recognition for the audio signal 1110 is started. With this, the electronic device 1200 may avoid the situation where unnecessary audio recognition is started or performed.

FIG. 2 is a block diagram for describing an electronic device for processing a misrecognized audio signal, according to an embodiment of the disclosure.

In an embodiment of the disclosure, the electronic device 1200 is an electronic device capable of performing audio recognition on audio signals, and more particularly, an electronic device for processing a misrecognized audio signal.

In an embodiment of the disclosure, the electronic device 1200 may include a memory 1210 and a processor 1220. The aforementioned components will now be described in detail.

The memory 1210 may store a program for processing and controlling of the processor 1220. According to an embodiment of the present disclosure, the memory 1210 may store one or more instructions.

The processor 1220 may control general operation of the electronic device 1200, and execute the one or more instructions stored in the memory 1210 to control an operation of the electronic device 1200.

In an embodiment of the disclosure, the processor 1220 may execute the one or more instructions stored in the memory to, based on preset at least one trigger word included in a received audio signal, determine whether the at least one trigger word included in the audio signal is misrecognized, based on the determining of whether the misrecognition is made, request an additional input from a user, and based on the user's additional input received in response to the request and the received audio signal, perform a function corresponding to the audio recognition.

In an embodiment of the disclosure, the processor 1220 may execute the one or more instructions stored in the memory to, based on preset at least one trigger word included in a received audio signal, determine whether the at least one trigger word included in the audio signal is misrecognized, based on the determining of whether the misrecognition is made, request an additional input from a user, and based on the user's additional input received in response to the request and the received audio signal, perform a function corresponding to the audio recognition.

In an embodiment of the disclosure, the processor 1220 may execute the one or more instructions stored in the memory to determine whether the at least one trigger word included in the audio signal is misrecognized based on history of execution of a function corresponding to the audio recognition within a preset first time.

In an embodiment of the disclosure, the processor 1220 may execute the one or more instructions stored in the memory to synchronize the received audio signal and a reference audio signal output through an audio output, and determine that the at least one trigger word included in the audio signal is misrecognized when similarity between the synchronized audio signal and the synchronized reference audio signal is at least preset first threshold.

In an embodiment of the disclosure, the processor 1220 may execute the one or more instructions stored in the memory to determine whether the at least one trigger word included in the audio signal is misrecognized, based on whether at least one input signal is included in the audio signal in addition to the at least one trigger word included in the audio signal.

In an embodiment of the disclosure, the processor 1220 may execute the one or more instructions stored in the memory to divide the audio signal into multiple sections except for a section corresponding to the at least one trigger word included in the audio signal, and determine whether the at least one trigger word included in the audio signal is misrecognized based on at least one of energy values of the multiple sections and zero-crossing rates (ZCRs) of the multiple sections.

In an embodiment of the disclosure, the processor 1220 may execute the one or more instructions stored in the memory to divide the audio signal into multiple sections except for a section corresponding to the at least one trigger word included in the audio signal, determine at least one section related to the misrecognition of the at least one trigger word included in the audio signal based on at least one of the energy values of the multiple sections and the ZCRs of the multiple sections, determine that the at least one input signal corresponding to the at least one section is included in the audio signal, and determine that the at least one trigger word included in the audio signal is misrecognized based on the determining that the at least one input signal is included in the audio signal.

In an embodiment of the disclosure, the processor 1220 may execute the one or more instructions stored in the memory to measure similarity between the preset at least one trigger word and the received audio signal, determine that at least one trigger word with the measured similarity being at least third threshold is included in the audio signal, and determine that at least one trigger word with the measured similarity being smaller than a fourth threshold is misrecognized among the at least one trigger word with the measured similarity being at least the third threshold.

In an embodiment of the disclosure, the processor 1220 may execute the one or more instructions stored in the memory to request an additional input from the user within at least one preset second time.

In an embodiment of the disclosure, the processor 1220 may execute the one or more instructions stored in the memory to control a display to request an additional input from the user based on the determining of whether the misrecognition is made.

In an embodiment of the disclosure, the processor 1220 may execute the one or more instructions stored in the memory to control a receiver to receive the audio signal.

In an embodiment of the disclosure, the processor 1220 may execute the one or more instructions stored in the memory to control a communication module to receive an audio signal from an external electronic device which receives an audio signal.

However, not all the illustrated components are essential. The electronic device 1200 may be implemented with more or fewer components than illustrated ones. For example, as shown in FIG. 3, the electronic device 1200 in an embodiment of the disclosure may include the memory 1210, the processor 1220, a receiver 1230, an output 1240, a communication module 1250, a user input 1260 and an external device interface module 1270.

FIG. 3 is a block diagram for describing an electronic device for processing a misrecognized audio signal, according to an embodiment of the disclosure.

In an embodiment of the disclosure, the electronic device 1200 is an electronic device capable of performing audio recognition on audio signals, and more particularly, an electronic device for processing a misrecognized audio signal. The electronic device may include various types of devices that may be used by the user such as a cell phone, a tablet PC, a PDA, an MP3 player, a kiosk, an electronic frame, a navigation device, a digital TV, a wearable device such as a wrist watch or a head-mounted display (HMD), etc. The electronic device 1200 may correspond to the following electronic device in FIGS. 4 to 15, but is not limited thereto.

The electronic device 1200 may further include the receiver 1230, the output 1240, the communication module 1250, the user input 1260, the external device interface module 1270 and a power supplier in addition to the memory 1210 and the processor 1220. The aforementioned components will now be described in detail.

The memory 1210 may store a program for processing and controlling of the processor 1220. In an embodiment of the disclosure, the memory 1210 may store one or more instructions, and may include at least one of an internal memory and an external memory. The memory 1210 may store various programs and data used for operation of the electronic device 1200. For example, the memory 1210 may store preset at least one trigger word, and store an AI model for determining similarity between the user's utterance and the preset at least one trigger word. Furthermore, the user's utterance that is input additionally may be used as training data of the AI model, but is not limited thereto.

The internal memory may include, for example, at least one of a volatile memory (e.g., a dynamic RAM (DRAM), an SRAM, a synchronous DRAM (SDRAM), etc.), a non-volatile memory (e.g., a one-time programmable ROM (OTPROM), a PROM, an erasable PROM (EPROM), an EEPROM, a mask ROM, a flash ROM, etc.), a hard disc drive (HDD) or a solid state drive (SSD). In an embodiment, the processor 1220 may load an instruction or data received from at least one of the non-volatile memory or another component onto the volatile memory and process the instruction or data. Furthermore, the processor 1220 may preserve data received from or generated by the other component in the non-volatile memory.

The external memory may include, for example, at least one of compact flash (CF), secure digital (SD), micro secure digital (Micro-SD), mini secure digital (Mini-SD), extreme digital (xD), or a memory stick.

The processor 1220 may control general operation of the electronic device 1200, and execute the one or more instructions stored in the memory 1210 to control an operation of the electronic device 1200. For example, the processor 1220 may execute the programs stored in the memory 1210 to generally control the memory 1210, the receiver 1230, the output 1240, the communication module 1250, the user input 1260, the external device interface module 1270, the power supplier, etc.

The processor 1220 may include at least one of a RAM, a ROM, a CPU, a GPU and a bus. The RAM, ROM, CPU and GPU may be interconnected via the bus. In an embodiment of the disclosure, the processor 1220 may include an AI processor for building up a learning network model without being limited thereto. In an embodiment of the disclosure, the AI processor may be implemented in a separate chip from the processor 1130. In an embodiment of the disclosure, the AI processor may be a universal chip.

In an embodiment of the disclosure, when the received audio signal includes the preset at least one trigger word, the processor 1220 may determine whether the at least one trigger word included in the audio signal is misrecognized, request an additional input from the user based on the determining of whether the misrecognition is made, and execute a function corresponding to audio recognition based on an additional input received in response to the request and the received audio signal. The respective operations performed by the processor 1220 may be performed by a separate server. For example, the processor 1220 may determine that the preset at least one trigger word is included in the user's utterance and there is no misrecognition on the trigger word. In this case, the server may refer to a cloud-based server, but is not limited thereto. In this case, audio recognition may be started, not exclusively, by a speech to text (STT) engine in the server, and the operation of executing the function corresponding to the audio recognition may be performed by the electronic device 1200. This will be described in detail in connection with FIG. 5.

The receiver 1230 may be built into the electronic device 1200 or may include a microphone arranged on the outside, and a mike module may include one or more microphones. Specifically, the processor 1220 may control the receiver 1230 to receive an analog audio signal of the user. Furthermore, the processor 1220 may determine whether the user's utterance or audio signal input through the receiver 1230 is similar to the at least one trigger word stored in the memory 1210. The audio signal received by the electronic device 1200 through the receiver 1230 may be digitized and transmitted to the processor 1220 of the electronic device 1200.

Alternatively, the audio signal may be received through a separate external electronic device including a microphone or a portable terminal including a microphone. In this case, the electronic device 1200 may not include the receiver 1230. Specifically, the analog audio signal received through the external electronic device or the portable terminal may be digitized, and then received by the electronic device 1200 through e.g., bluetooth, without being limited thereto. The receiver 1230 will be described in detail in connection with FIG. 5.

The output 1240 may include at least one of a display 1241 and an audio output 1242.

The display 1241 may include a display panel and a controller for controlling the display panel, and the display 1241 may refer to a display built into the electronic device 1200. The display panel may be implemented as various types of displays such as a liquid crystal display (LCD), an organic light emitting diode (OLED) display, active-matrix (AM) OLEDs, a plasma display panel (PDP), etc. The display panel may be implemented to be flexible, transparent or wearable. The display 1241 may be combined with a touch panel in the user input 1260 and provided as a touch screen. For example, the touch screen may include an integrated module in which the display panel and a touch panel are combined in a layered structure.

In some embodiments, the display 1241 may output a user interface related to the additional input corresponding to whether the trigger word is misrecognized, under the control of the processor 1220. Alternatively, the electronic device 1200 may output the user interface related to the additional input corresponding to whether the misrecognition is made on the display of an external electronic device through a video and audio output port. In this case, the display 1241 may be included in the electronic device 1200 but is not limited thereto.

The audio output 1242 may be an output comprised of at least one speaker. In some embodiments, the processor 1220 may control the audio output 1242 to output an audio signal corresponding to the additional input corresponding to whether the trigger word is misrecognized.

The communication module 1250 may include one or more components that enable communication between the electronic device 1200 and a plurality of devices located around the electronic device 1200. The communication module 1250 may include one or more components that enable communication between the electronic device 1200 and a server. Specifically, the communication module 1250 may perform communication with various types of external devices or servers according to various types of communication schemes. The communication module 1250 may also include a short-range communication module.

The short-range communication module may include a bluetooth communication module, a bluetooth low energy (BLE) communication module, a near field communication (NFC) module, a WLAN, e.g., Wi-Fi, communication module, a Zigbee communication module, an infrared data association (IrDA) communication module, a Wi-Fi direct (WFD) communication module, a ultra wideband (UWB) communication module, an Ant+ communication module, an Ethernet communication module, etc., without being limited thereto.

Specifically, when the respective operations otherwise performed by the processor 1220 are performed by the server, the electronic device 1200 may be connected to the server through a Wi-Fi module or an Ethernet module of the communication module 1250, but is not limited thereto. In this case, the server may refer to a cloud-based server. Furthermore, the electronic device 1200 may be connected to an external electronic device that receives audio signals through a bluetooth communication module of the communication module 1250, but is not limited thereto. For example, the electronic device 12000 may be connected to the external electronic device that receives audio signals through at least one of the Wi-Fi module and the Ethernet module of the communication module 1250.

The user input 1260 may receive various commands from the user.

The user input 1260 may include at least one of a key, a touch panel and a pen recognition panel. The electronic device 1200 may display various contents or user interfaces in response to the user input received from at least one of the key, the touch panel and the pen recognition panel. The key may include a mechanical button, a wheel, etc., formed in various regions such as the front, side, back of the exterior of the main body of the electronic device 1200. The touch panel may detect the user's touch input and output a touch event value corresponding to the detected touch signal. In embodiments when the touch panel and the display panel are combined into a touch screen, the touch screen may be implemented with touch sensors of various types such as capacitive, resistive, piezoelectric, etc. In an embodiment of the disclosure, a threshold related to the similarity between the audio signal and the preset at least one trigger word may be adaptively controlled through the user input 1260, but is not limited thereto.

The external device interface module 1270 provides interface environments between the electronic device 1200 and various external devices. The external device interface module 1270 may include an A/V input/output. The external device interface module 1270 may be wiredly/wirelessly connected to an external device such as a digital versatile disk (DVD) and blue-ray, a game device, a camera, a computer, an air conditioner, a laptop, a desktop, a television, a digital display device, etc. The external device interface module 1270 may send an image, video and audio signals input through the connected external device to the processor 1220 of the electronic device 1200. The processor 1220 may control to output processed data signals such as 2D images, 3D images, video, audio, etc., to the connected external device. The A/V input/output may include a USB terminal, a composite video banking sync (CVBS) terminal, a component terminal, an S-video terminal (analog), a digital visual interface (DVI) terminal, a high definition multimedia interface (HDMI) terminal, a display port (DP), Thunderbolt, RGB terminals, a D-SUB terminal, etc., to input the video and image signals of the external device to the electronic device 1200. In an embodiment of the disclosure, the processor 1220 may be connected to the external electronic device that receives audio signals through an interface such as the HDMI terminal of the external device interface module 1270. In an embodiment of the disclosure, the processor 1220 may be connected to an external electronic device that outputs a user interface related to an additional input in response to whether the misrecognition is made through at least one interface such as the HDMI terminal, the DP and Thunderbolt, etc., of the external device interface module 1270.

The electronic device 1200 may further include a power supplier. The power supplier may supply power to the components of the electronic device 1200 under the control of the processor 1220. The power supplier may supply power received from an external power source via a power cord to the respective components of the electronic device 1200 under the control of the processor 1220.

Figure 4:
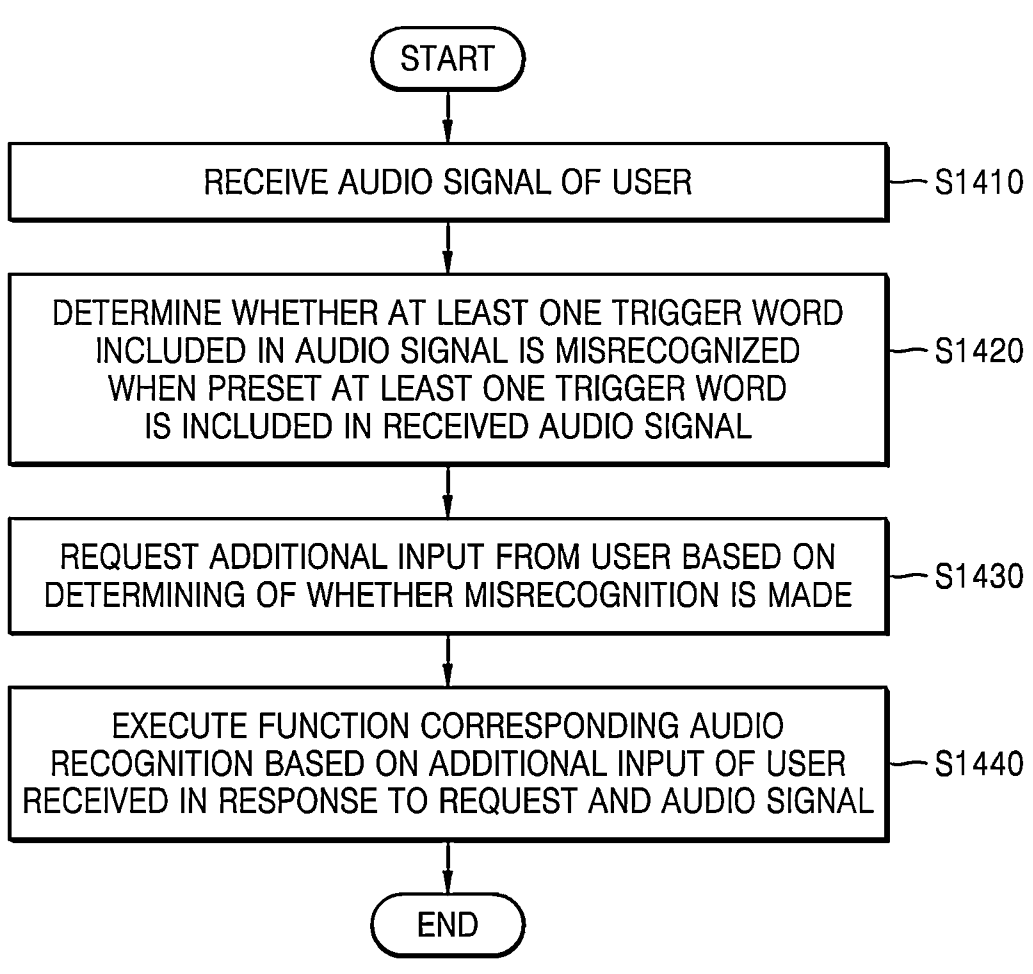
FIG. 4 is a flowchart for processing a misrecognized audio signal, according to an embodiment of the disclosure.

FIG. 4 is a flowchart for processing a misrecognized audio signal, according to an embodiment of the disclosure.

In operation S1410, the electronic device according to an embodiment of the disclosure may receive an audio signal.

In an embodiment of the disclosure, the electronic device 1200 may receive an audio signal through the receiver 1230 of the electronic device 1200. Specifically, the electronic device 1200 may receive an audio signal through a microphone of the receiver 1230. The audio signal may include, not exclusively, audio signals related to conversations with many other people or audio signals output from the external electronic device.

Furthermore, in an embodiment of the disclosure, the electronic device 1200 may be an electronic device that does not include the receiver 1230, and in this case, may receive an audio signal through an external electronic device or portable terminal including a microphone. Specifically, the user may input an audio signal to the microphone attached to the external control device, and the input audio signal may be digitized and transmitted to the communication module of the electronic device 1200. Furthermore, for example, the user may input an audio signal through an application of the portable terminal, and the input audio signal may be transmitted or received to or from the communication module of the electronic device 1200 through Wi-Fi, bluetooth or infrared, without being limited thereto.

In operation S1420, the electronic device according to an embodiment of the disclosure may determine based on the preset at least one trigger word included in the received audio signal whether the at least one trigger word included in the audio signal is misrecognized.

In an embodiment of the disclosure, the at least one trigger word may be a word used to determine the start of audio recognition. The at least one trigger word may be a previously learned word for an entity that determines similarity to the user's utterance through a wake-up word engine (WWE). The at least one trigger word may include a plurality of trigger words.

In an embodiment of the disclosure, the electronic device 1200 may determine through the WWE whether the received audio signal includes the preset at least one trigger word. Specifically, the WWE may be a module for determining similarity between the user's utterance or audio signal and the at least one trigger word based on an acoustic model trained with acoustic information for the preset at least one trigger word. The WWE may determine, based on probability information corresponding to the determined similarity, whether the preset at least one trigger word is included in the received audio signal. As the WWE is a module for determining whether the preset at least one trigger word is included in the received audio signal based on the similarity between the preset trigger word and the audio signal, it may be a low-capacity engine as compared to the speech to text (STT) engine that converts the user's utterance into text.

Specifically, the processor 1220 may determine that the preset at least one trigger word is included in the received audio signal when the similarity measured by the WWE is equal to or greater than a preset threshold. The operation of determining whether the preset at least one trigger word is included in the received audio signal will be described in detail in connection with FIG. 13.

In an embodiment of the disclosure, the electronic device 1200 may determine that the preset at least one trigger word is not included in the received audio signal. For example, the electronic device 1200 may terminate the audio recognition operation for the received audio signal when the at least one trigger word is not included in the audio signal. Specifically, the processor 1220 may determine that the preset at least one trigger word is not included in the received audio signal when the similarity measured by the WWE is less than the preset threshold. In this case, the electronic device 1200 may operate in a standby mode until a new audio signal is received. When the new audio signal is received, the electronic device 1200 may determine whether the preset at least one trigger word is included in the newly received audio signal. As the electronic device 1200 determines whether the at least one trigger word is included in the audio signal based on similarity between the preset at least one trigger word and the user's utterance, even the at least one trigger word included in the audio signal may be misrecognized. Herein, the at least one trigger word included in the audio signal may refer to at least one trigger word determined by the processor 1220 of the electronic device 1200 as being included in the audio signal. A method of determining whether at least one trigger word included in an audio signal is misrecognized will now be described.

In an embodiment, the electronic device 1200 according to an embodiment of the disclosure may determine whether the at least one trigger word included in the audio signal is misrecognized based on history of execution of a function corresponding to audio recognition within a preset first time.

In an embodiment of the disclosure, the history of execution of the audio recognition function of the user or the electronic device may show a tendency to be concentrated in a specific time zone (for example, morning or afternoon) or within a preset time. Hence, when there is no history of execution of the audio recognition function through the electronic device within the preset first time, the electronic device 1200 may determine that the at least one trigger word included in the audio signal is misrecognized. For example, a certain user may show a tendency to utter an audio signal, "Bixby! How is the weather today?" through audio recognition at around 8 o'clock every morning. In this case, for the audio recognition on the user's utterance at around 8 a.m., it may be better for the electronic device 1200 to execute the function corresponding to the audio recognition without an operation of requesting an additional input from the user with consideration for the history of execution of the function. Furthermore, for example, for the audio recognition for the user's utterance at around 8 p.m., the electronic device 1200 may request an additional input from the user by considering that there is no history of execution of the audio recognition function at around 8 p.m.

The preset time may be adjusted through the user input 1260. Furthermore, the preset time may be adaptively adjusted based on the user's history of execution of the audio function or adjusted through the server, but is not limited thereto. The operation of determining whether at least one trigger word included in the audio signal is misrecognized based on the history of execution of the function corresponding to audio recognition will be described in detail in connection with FIG. 6.

In the same or another embodiment, the electronic device 1200 according to an embodiment of the disclosure may determine whether the at least one trigger word included in the audio signal is misrecognized based on a reference audio signal output from the electronic device 1200.

In an embodiment of the disclosure, the electronic device 1200 may output the reference audio signal through the audio output 1242. In the specification, the reference audio signal may refer to an audio signal output from the electronic device 1200 itself, and specifically, an audio signal related to a content being output from the electronic device 1200. The reference audio signal may include a word having a similar pronunciation structure to the preset at least one trigger word. For example, the electronic device 1200 may output things related to 'Bixbyite', which is a type of mineral, from geology-related content through the audio output, and the reference audio signal may include 'Bixbyite' that has a similar pronunciation to a trigger word 'Bixby'. Hence, the receiver 130 of the electronic device 1200 may receive an audio signal corresponding to the reference audio signal output from the audio output 1242, and the electronic device 1200 may misrecognize that the audio signal received through the receiver 1230 includes the trigger word, Bixby.

In this case, the electronic device 1200 may prevent an echo phenomenon caused by reception of the output reference audio signal at the receiver 1230 of the electronic device 1200 through acoustic echo cancellation (AEC) but the residual echo may come into the WWE, so there are still chances of having misrecognition on the audio signal. Hence, the electronic device 1200 may determine whether the at least one trigger word included in the audio signal is misrecognized based on the reference audio signal output from the electronic device 1200. A specific operation of determining that the at least one trigger word included in the audio signal is misrecognized based on the audio signal received through the receiver and the reference audio signal output from the electronic device will be described in detail in connection with FIGS. 7 to 9.

In a same or another embodiment, the electronic device 1200 according to an embodiment of the disclosure may determine whether the at least one trigger word included in the audio signal is misrecognized, based on whether at least one input signal is included in the audio signal in addition to the at least one trigger word included in the audio signal.

In an embodiment of the disclosure, the electronic device 1200 may receive a continuous audio signal including at least one input signal in addition to the at least one trigger word included in the audio signal. In general, the user 1100 has a tendency to utter one of the at least one trigger word first and with a certain time gap, utter a command related to audio recognition. However, the electronic device 1200 may seamlessly receive everyday conversation along with the preset trigger word, and the audio signal played by an external electronic device, or the user may sometimes utter an audio signal of a long sentence fast without a pause. In this case, the electronic device 120 may even receive a continuous audio signal including not only the at least one trigger word but also at least one input signal. In this case, in the case that the electronic device 120 receives a continuous audio signal including not only the at least one trigger word but also at least one input signal, it may determine that the audio signal is misrecognized.

In an embodiment of the disclosure, the electronic device 1200 may divide an audio signal into multiple sections except for a section corresponding to at least one trigger word included in the audio signal, and determine whether the at least one trigger word included in the audio signal is misrecognized based on at least one of energy values of the multiple sections and zero-crossing rates (ZCRs) of the multiple sections. Specifically, the electronic device 1200 may divide the audio signal into multiple sections except for a section corresponding to the at least one trigger word included in the audio signal, and use energy values and ZCRs of the multiple sections to identify at least one section determined to have at least one input signal from among the multiple sections. In this case, the electronic device 1200 may determine that misrecognition is made in the audio recognition by considering that there is at least one input signal in the audio signal in addition to the at least one trigger word. It may determine whether the at least one trigger word included in the audio signal is misrecognized, based on whether at least one input signal is included in the audio signal in addition to the at least one trigger word included in the audio signal. A specific operation of determining whether at least one trigger word included in the audio signal is misrecognized based on whether at least one input signal is included in the audio signal will be described in detail in connection with FIGS. 10 to 12.

In a same or another embodiment, the electronic device 1200 according to an embodiment of the disclosure may determine whether the at least one trigger word included in the audio signal is misrecognized, based on similarity between the at least one trigger word included in the audio signal and the audio signal.

In an embodiment of the disclosure, the similarity between the at least one trigger word included in the audio signal and the audio signal may be the same similarity used to determine whether the preset at least one trigger word is included in the received audio signal, but is not limited thereto. For example, the similarity between the at least one trigger word included in the audio signal and the audio signal may be lower than a preset threshold. In this case, the processor 1220 may determine that misrecognition is made for the at least one trigger word with the measured similarity being less than the threshold. The operation of determining whether at least one trigger word included in the audio signal is misrecognized based on the similarity between the at least one trigger word included in the audio signal and the audio signal will be described in detail in connection with FIGS. 13 to 15.

The electronic device 1200 may use at least one of the aforementioned methods to determine whether the at least one trigger word included in the audio signal is misrecognized. The electronic device 1200 may use at least one of the aforementioned methods in any order. to determine whether the at least one trigger word included in the audio signal is misrecognized. When it is determined that the at least one trigger word included in the audio signal is misrecognized by using at least one of the aforementioned methods, the electronic device 1200 may request an additional input corresponding to the used method from the user in operation S1420.

In an embodiment of the disclosure, the electronic device 1200 may not request any additional input from the user when the at least one trigger word included in the audio signal is not misrecognized. In this case, the electronic device 1200 may execute a function corresponding to audio recognition on the received audio signal without the user's additional input.

In operation S1430, the electronic device according to an embodiment of the disclosure may request an additional input from the user based on the determining of whether the misrecognition is made.

In an embodiment of the disclosure, the electronic device 1200 may request the additional input through the display 1241 by generating a user interface to correspond to any aforementioned methods used in operation S1420.

In an embodiment of the disclosure, the electronic device 1200 may not include the display. In this case, the processor 1220 of the electronic device 1200 may control a UI including an additional input to be output through an external electronic device including a display. Furthermore, the electronic device 1200 may be connected to the external electronic device including the display through the external device interface module 1270. In this case, the processor 1220 may control video signals so that the UI including the additional input is output through the external electronic device including the display.

In an embodiment of the disclosure, the electronic device 1200 may request a method-dependent additional input from the user to correspond to the aforementioned methods. Specifically, methods of requesting of additional inputs will be described in detail in connection with FIGS. 9, 12 and 15.

In operation S1440, in an embodiment of the disclosure, the electronic device may execute a function corresponding to audio recognition based on the user's additional input received in response to the request and the audio signal.

In an embodiment of the disclosure, the electronic device 1200 may request an additional input from the user within a preset time, and when a suitable response is received from the user in response to the request, may execute the function corresponding to audio recognition based on the received audio signal.

For example, when it is a case that corresponds to at least one of an occasion when the user does not respond within the preset time and an occasion when the user rejects the request for an additional input, the electronic device 1200 may terminate the audio recognition on the audio signal. On the other hand, the user may utter a suitable additional input within the preset time. In this case, based on a suitable response from the user, the electronic device 1200 may determine that the misrecognition of the trigger word included in the audio signal is resolved and execute the function corresponding to audio recognition based on the received audio signal.

In an embodiment of the disclosure, the operation of executing the function corresponding to audio recognition based on the audio signal may be performed by the STT engine. The STT engine may be a trained engine based on acoustic data, or a module that converts the user's utterance into text at a low error rate. The STT engine may be a high-capacity engine as compared to the WWE engine that determines whether the preset at least one trigger word is included in the audio signal.

The electronic device 1200 may firstly determine whether the trigger word is misrecognized from the audio signal, and then perform correct audio recognition through the STT engine, so that 1) audio recognition may be terminated when it is determined that the trigger word is misrecognized, 2) energy may be used efficiently by not performing correct audio recognition through the STT engine when the trigger word is misrecognized, and 3) the unexpected start of audio recognition may be prevented for the user.

Figure 5:
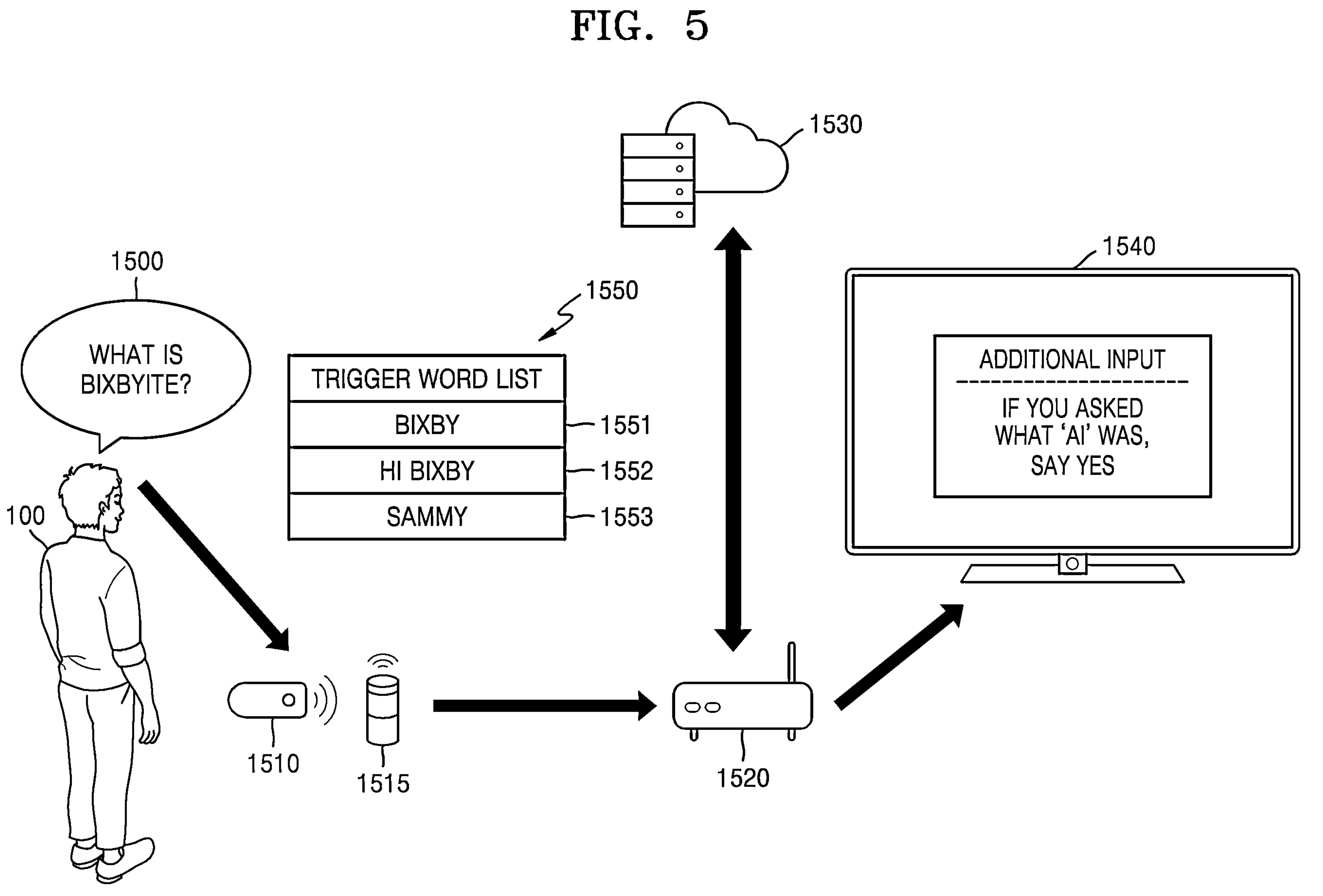
FIG. 5 is a diagram illustrating a method of processing a misrecognized audio signal in detail, according to an embodiment of the disclosure.

FIG. 5 is a diagram illustrating a method of processing a misrecognized audio signal in detail, according to an embodiment of the disclosure.

In an embodiment of the disclosure, the electronic device may receive an audio signal 1500 of the user 1100, "what is Bigsbyite?" through the receiver. Alternatively, as shown in FIG. 5, an electronic device 1520 that does not include any extra receiver may receive an audio signal through an external electronic device. The external electronic device that receives the audio signal may include, not exclusively, a remote control 1510, a portable terminal, an AI speaker 1515, etc.

For example, the external electronic device may be the remote control 1510 equipped with a microphone, but is not limited thereto. The remote control 1510 may receive an analog audio signal through the microphone, and the received analog audio signal may be converted to a digital audio signal. The electronic device 1520 may receive the digital audio signal by data communication such as bluetooth or Wi-Fi through the communication module. The electronic device 1520 may correspond to the electronic device 1200 of FIG. 2.

Furthermore, for example, when the external electronic device that receives the audio signal is an AI speaker, a remote control application is installed in the AI speaker 1515, and the AI speaker 1515 may then operate as an external electronic device for receiving analog audio signals. Specifically, the electronic device 1520 may receive the audio signal 1500 of the user 1100 through the AI speaker 1515 with the remote control application installed therein. The electronic device 1520 may control the audio signal 1500 received from the AI speaker 1515 to be transmitted to or received from the communication module of the electronic device 1520 through Wi-Fi, Bluetooth or infrared communication. In the specification, the communication module of the electronic device 1520 may be a communication module configured to control the portable UE or the AI speaker 1515, but is not limited thereto. Furthermore, referring to FIG. 5, the external electronic device that receives the audio signal may refer to the AI speaker 1515, but is not limited thereto, and the external electronic device that receives audio signals may refer to a portable terminal, a tablet PC, etc.

In an embodiment of the disclosure, the at least one trigger word may be preset and stored in a memory of the electronic device 1520. For example, a trigger word list 1550 may include 'Bixby' 1551, 'Hi, Bixby' 1552 and 'Sammy' 1553. For each trigger word, a different threshold may be used to determine whether the trigger word is included in the audio signal 1500 of the user 1100. For example, for 'Sammy' 1553 with short syllables, a threshold higher than 'Bixby' 1551 or 'Hi, Bixby' with long syllables may be set, and a threshold of the at least one trigger word included in the trigger word list 1550 may be adjusted, not exclusively, by the user.

In an embodiment of the disclosure, the operation of determining whether the preset at least one trigger word is included in the received audio signal, the operation of determining based on the determining that at least one trigger word is included in the audio signal whether the at least one trigger word included in the audio signal is misrecognized, the operation of requesting an additional input from the user based on the determining of whether the misrecognition is made, and the operation of executing a function corresponding to audio recognition based on the user's additional input received in response to the request and the audio signal may be performed selectively by at least one of the electronic device 1520 and a server 1530.

For example, when the operation of determining whether the preset at least one trigger word is included in the received audio signal, the operation of determining based on the determining that at least one trigger word is included in the audio signal whether the at least one trigger word included in the audio signal is misrecognized, and the operation of requesting an additional input from the user based on the determining of whether the misrecognition is made are performed by the electronic device 1520, the operation of executing the function corresponding to audio recognition may be started by the server 1530 based on the user's additional input received in response to the request and the audio signal. Furthermore, when the electronic device 1520 determines that the determined trigger word is not misrecognized, the server 1530 may start the operation of executing the function corresponding to audio recognition based on the received audio signal without an operation of requesting an additional input from the user. In this case, the server 1530 may refer to a server that operates as an STT server that converts data related to the audio signal into suitable text. The data processed by the server 1530 may be transmitted back to the electronic device 1520 or transmitted to another server.

Furthermore, in an embodiment of the disclosure, the server 1530 may be a main server for performing not only the operation of executing the function corresponding to audio recognition based on the audio signal but also all the aforementioned operations. In this case, the electronic device 1520 may be an electronic device for performing only the operation of receiving the audio signal and the server 1530 may operate as a main server for performing other operations than the operation of receiving the audio signal, but the disclosure is not limited thereto. On the other hand, the electronic device 1520 in the specification may be an electronic device for performing all the aforementioned operations, but is not limited thereto.

In an embodiment of the disclosure, the operation of determining whether the preset at least one trigger word is included in the received audio signal, the operation of determining based on the determining that at least one trigger word is included in the audio signal whether the at least one trigger word included in the audio signal is misrecognized, the operation of requesting an additional input from the user based on the determining of whether the misrecognition is made, and the operation of executing a function corresponding to audio recognition based on the user's additional input received in response to the request and the audio signal may be performed by the electronic device 1520 and the server 1530 in combination. The electronic device 1520 may operate as an electronic device for processing the misrecognized audio signal by communicating with the server 1530 through a Wi-Fi module or an Ethernet module of the communication module. In the specification, the communication module 1250 of the electronic device 1200 may include the Wi-Fi module or the Ethernet module to perform all the aforementioned operations, but is not limited thereto.

In an embodiment of the disclosure, the electronic device may not necessarily include a display, and the electronic device 1520 of FIG. 5 may be a set-top box that has no display or an electronic device including a simple display for alarming. According to the operation of requesting the additional input from the user based on the determining of whether the misrecognition is made, an external electronic device 1540 including the display may output a UI related to the additional input through the display. For example, the external electronic device 1540 is connected to the electronic device through an external device interface module, so it may receive a signal about the UI related to an additional input from the electronic device 1520, and the external electronic device 1540 may output the UI related to the additional input through the display. Specifically, the external device interface module may include at least one of HDMI, DP and Thunderbolt, without being limited thereto. Furthermore, for example, the external electronic device 1540 may receive signals of the UE related to the additional input from the electronic device 1520 based on wireless communication with the electronic device and output them through the display, but is not limited thereto.

In an embodiment of the disclosure, the electronic device 1520 or the server 1530 may misrecognize the audio signal 1500 of the user 1100 as "What is, Bigsby, I (ai)" or "Bigsby! What is 'ai'?". In this case, the UI output through the external electronic device 1540 may include an additional input, "if you asked what 'a child' was, say yes".

FIG. 6 is a diagram of an example of a method of determining whether at least one trigger word included in an audio signal is misrecognized, based on a history of execution of a function corresponding to audio recognition, and the user's additional inputs based on the determining, according to an embodiment of the disclosure.

The electronic device 1200 according to an embodiment of the disclosure may determine whether the at least one trigger word included in the audio signal is misrecognized based on a history of execution of a function corresponding to audio recognition.

In an embodiment of the disclosure, the history of execution of the audio recognition function of the user or the electronic device may show a tendency to be concentrated in a specific time zone (for example, morning or afternoon) or within a preset time. For example, when the user watches a movie through a TV, the user may utter sentences including successive multiple commands to execute 1) an operation of powering on the TV, 2) an operation of switching the TV channel and 3) an operation of adjusting the volume of the TV. Hence, for example, when there is a history of execution of the audio function within a certain time before an audio signal is received, the electronic device 1200 may determine that the user 1100 has uttered the audio signal with an intention to execute audio recognition. Accordingly, when there is a history of execution of the audio function within the certain time before the audio signal is received, the user 1100 may quickly execute the audio recognition from the second utterance without a separate additional input.

In an embodiment of the disclosure, the user 1100 may utter an analog audio signal, "Bixby, switch into a power saving mode" 1610 at 15:15 p.m. 1611, and utter an analog audio signal, "what is Bixbyite?" 1660 at 16:15 p.m. 1661.

In an embodiment of the disclosure, the memory of the electronic device 1200 may store a history 1630 of execution of a function corresponding to audio recognition. Specifically, the history 1630 of execution of the function may be stored in the memory in the form of a data table including audio recognition content information 1650 and time information 1640. For example, the history 1630 of execution of the function may include audio recognition history including information "switch into the active mode" performed at 15:12:05, audio recognition history including information "change to channel 9" performed at 15:12:10 and audio recognition history including information "volume up" performed at 15:12:20.

In an embodiment of the disclosure, the electronic device 1200 may determine whether the at least one trigger word included in the audio signal is misrecognized based on the history of execution of the function corresponding to audio recognition within a preset time. For example, the electronic device 1200 may determine that the at least one trigger word included in the audio signal is misrecognized when there is no history of execution of the function corresponding to audio recognition within the preset time through the electronic device. Specifically, the preset time may be 5 minutes, but is not limited thereto.

For example, the electronic device 1200 may determine that there is the history of execution of audio recognition of the electronic device 1200 for 5 minutes before 15:15 1611 at which the audio signal "Bixby, switch into the power saving mode" 1610 is received. Hence, the electronic device 1200 may determine that there is no need 1614 for an additional input corresponding to the audio signal "Bixby, switch into the power saving mode" 1610 based on the history 1630 of execution of the function.

Furthermore, for example, the electronic device 1200 may misrecognize the audio signal "what is Bixbyite" 1660 as "what is Bixby 'I (ai)'?". However, the electronic device 1200 may determine that there is no history of execution of the function of the audio recognition in the electronic device 1200 for 5 minutes before 16:15 1661 at which the audio signal "what is Bixbyite?" is received, and the electronic device 1200 may determine that there is a need 1664 for an additional input corresponding to the audio signal "what is Bixbyite?" 1660 based on the history 1630 of execution of the function.

Furthermore, in an embodiment of the disclosure, the electronic device 1200 may determine that at least one trigger word included in the audio signal of the user 1100 is misrecognized by taking into account the audio recognition content information 1650 and the time information 1640 comprehensively. For example, determination that there is no need 1614 for an additional input corresponding to the audio signal "Bixby, switch into the power saving mode" 1610 may be made by also considering the fact that the audio recognition content information 1650 is related to an operation state of the electronic device 1200, but is not limited thereto.

FIG. 7 is a flowchart for determining based on an audio signal received by a receiver of the electronic device and a reference audio signal whether at least one trigger word included in the audio signal is misrecognized, according to an embodiment of the disclosure.

In operation S1710, the electronic device according to an embodiment of the disclosure may synchronize the received audio signal with a reference audio signal output from the electronic device.

In the specification, the reference audio signal may refer to an audio signal output from the electronic device 1200 itself, and specifically, an audio signal related to a content being output from the electronic device 1200. The reference audio signal may include a word having a similar pronunciation structure to the preset at least one trigger word. For example, the electronic device 1200 may output things related to 'Bixbyite', which is a type of mineral, from among geology-related content through the audio output, and the reference audio signal may include 'Bixbyite' that has a similar pronunciation to a trigger word 'Bixby'. Hence, the receiver 130 of the electronic device 1200 may receive an audio signal corresponding to the reference audio signal output from the audio output 1242, and the electronic device 1200 may misrecognize that the audio signal received through the receiver 1230 includes the trigger word, Bixby. To distinguish an output signal output from the electronic device 1200 from a signal resulting from reception of the output signal, the signal output from an audio output 1242 will be referred to as the reference audio signal, and the signal resulting from reception of the output reference audio signal by the receiver 1230 will be referred to as an audio signal. Specifically, even when the user does not utter an audio signal, misrecognition may be made based on the reference audio signal output through the audio output 1242 of the electronic device 1200.

Specifically, in an embodiment of the disclosure, the processor 1220 of the electronic device 1200 may cancel the audio signal corresponding to the reference audio signal received by the receiver 1230 through acoustic echo cancellation (AEC), but residual echo may come into the receiver 1230 because the cancellation is not perfect depending on the situation. In this case, when the pronunciation of the non-canceled reference audio signal is similar to at least one trigger word stored in the memory 1210, the processor 1220 may be likely to misrecognize the trigger word as being included in the audio signal. Accordingly, the received audio signal may include an audio signal resulting from reception, through the receiver of the electronic device, of the audio signal output through the output of the electronic device.

Hence, the electronic device 1200 according to an embodiment of the disclosure may synchronize the reference audio signal output from the audio output 1242 with the audio signal received through e.g., the audio receiver 1230. For example, the reference audio signal related to content such as movies, songs, etc., may be output through the audio output 1242 of the electronic device 1200, and the electronic device 1200 may receive, through the receiver 1230, an audio signal corresponding to the output reference audio signal. In this case, the electronic device 1200 may synchronize the received audio signal and the reference audio signal, which are separated in time, to determine whether the received audio signal is equal to the reference audio signal.

In an embodiment of the disclosure, the processor 1220 of the electronic device 1200 may synchronize the received audio signal and the reference audio signal output from the electronic device before comparing similarity between the received audio signal and the reference audio signal. For example, there is a time gap between when the reference audio signal is output and when the residual echo is received. Hence, the electronic device 1200 may synchronize the received audio signal and the reference audio signal output from the electronic device to determine similarity between the received audio signal and the reference audio signal.

In operation S1720, the electronic device according to an embodiment of the disclosure may determine whether the similarity between the synchronized audio signal and the synchronized reference signal is equal to or greater than a preset threshold.

In an embodiment of the disclosure, the electronic device 1200 may measure similarity between the synchronized audio signal and the synchronized reference audio signal. The electronic device 1200 may determine whether the measured synchronized audio signal and synchronized reference audio signal are the same signals based on the similarity between the measured synchronized audio signal and synchronized reference audio signal.

Specifically, the electronic device 1200 may determine whether the received audio signal is the same signal as the synchronized reference audio signal by comparing the magnitude of a peak value of the synchronized audio signal with the magnitude of a peak value of the synchronized reference audio signal. Furthermore, for example, the electronic device 1200 may determine whether the received audio signal is the same signal as the synchronized reference audio signal by comparing the distribution of the synchronized audio signal with the distribution of the synchronized reference audio signal. Moreover, for example, the electronic device 1200 may determine whether the received audio signal is the same signal as the synchronized reference audio signal by comparing an energy level for each frequency band of the synchronized audio signal with an energy level for each frequency band of the synchronized reference audio signal, but the disclosure is not limited thereto. The preset threshold may be adjusted by the user through the user input 1260, or may be adaptively adjusted by the server, but is not limited thereto. The preset threshold may be stored in the memory 1210.

In operation S1730, the electronic device according to an embodiment of the disclosure may determine that at least one trigger word included in the audio signal is misrecognized when the similarity between the synchronized audio signal and the synchronized reference audio signal is at least the preset threshold.

The electronic device according to an embodiment of the disclosure may determine that the received audio signal is the same signal as the synchronized reference audio signal when the similarity between the synchronized audio signal and the synchronized reference audio signal is at least the preset threshold. Accordingly, the electronic device may determine that at least one trigger word included in the audio signal is misrecognized.

In operation S1740, the electronic device according to an embodiment of the disclosure may determine that at least one trigger word included in the audio signal is not misrecognized when the similarity between the synchronized audio signal and the synchronized reference audio signal is less than the preset threshold.

The electronic device according to an embodiment of the disclosure may determine that the received audio signal is different from the synchronized reference audio signal when the similarity between the synchronized audio signal and the synchronized reference audio signal is less than the preset threshold. In this case, the processor 1220 of the electronic device 1200 may perform another method of determining whether at least one trigger word included in the audio signal is misrecognized. Furthermore, the processor 1220 of the electronic device 1200 may determine that the at least one trigger word included in the audio signal is not misrecognized, and execute a function corresponding to audio recognition on the received audio signal without requesting a separate additional input, but the disclosure is not limited thereto.

Figure 8:
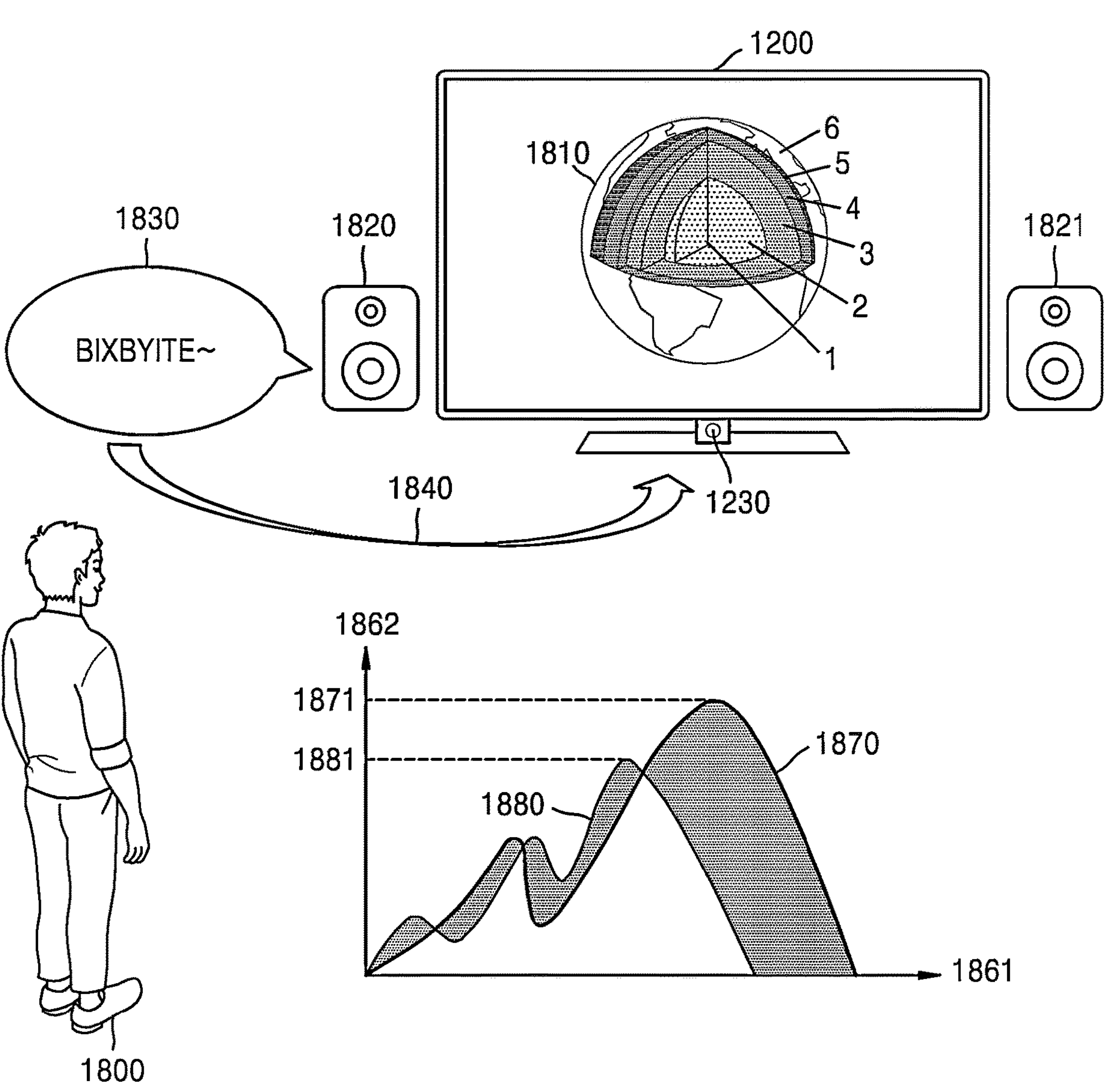
FIG. 8 is a diagram illustrating a method for processing a misrecognized audio signal, according to an embodiment of the disclosure.

FIG. 8 is a diagram for describing an example of a method of determining based on a reference audio signal of an electronic device whether at least one trigger word included in an audio signal is misrecognized, according to an embodiment.

In an embodiment of the disclosure, the electronic device 1200 may output a reference audio signal 1830 through the audio output comprised of a left speaker 1820 and a right speaker 1821. The electronic device 1200 may then receive an audio signal 1840 corresponding to the output reference audio signal 1830 "Bixbyite . . . " through the receiver 1230 of the electronic device 1200. The audio signal 1840 may refer to an audio signal coming into the receiver 1230 among the audio signal 1830. The reference audio signal 1830 may be an audio signal determined based on a content 1810 output from the electronic device 1200, but is not limited thereto. The audio signal received through the receiver 1230 in FIG. 8 may not include an utterance of a user 1800, and based on the reference audio signal 1830, misrecognition related to at least one trigger word Bixby may occur.

In an embodiment of the disclosure, the x-axis of a graph 1860 may represent time 1861, and the y-axis may represent magnitude 1862 of a signal. As shown in the graph 1860, the electronic device 1200 may determine that the received audio signal is the same signal as the synchronized reference audio signal by comparing a magnitude 1871 of the peak value of a synchronized audio signal 1870 with a magnitude 1881 of the peak value of a synchronized reference audio signal 1880. Specifically, when similarity determined based on the magnitude 1871 of the peak value and the magnitude 1881 of the peak value is equal to or greater than a preset threshold, the electronic device 1200 may determine that the received audio signal is the same signal as the synchronized reference audio signal, and determine that at least one trigger word included in the audio signal is misrecognized due to residual echo. Alternatively, as described above in connection with FIG. 7, the similarity between the synchronized audio signal and the synchronized reference audio signal may be determined based on the magnitude of the peak value of the audio signal, the distribution of the audio signal and the energy level for each frequency band of the audio signal, but the disclosure is not limited thereto.

Figure 9:
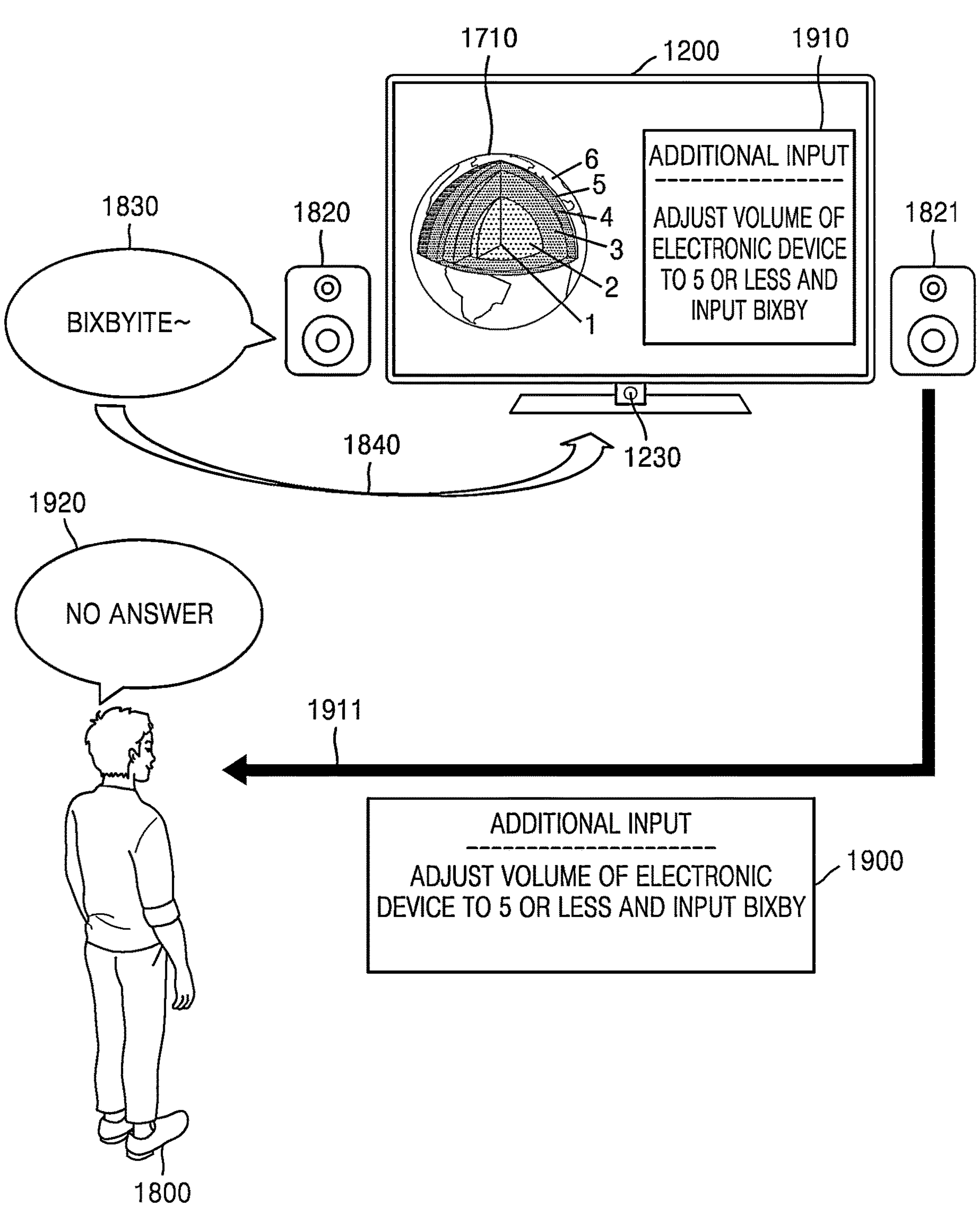
FIG. 9 is a diagram of an embodiment of additional inputs from a user according to FIG. 8.

FIG. 9 is a diagram of an embodiment of additional inputs from a user according to FIG. 8.

The electronic device 1200 according to an embodiment of the disclosure may determine that at least one trigger word included in the audio signal is misrecognized when the similarity between the synchronized audio signal and the synchronized reference audio signal is at least the preset threshold.

In an embodiment of the disclosure, the electronic device 1200 may request an additional input from the user 1800 in response to the determining that the at least one trigger word included in the audio signal is misrecognized. For example, based on the determining that the misrecognition is made due to residual echo, the processor 1220 may request an additional input corresponding to the misrecognition caused by the residual echo from the user 1800. Specifically, an additional input 1900 may include a content requesting an input of the user 1800 to reduce misrecognition caused by the residual echo.

For example, in an embodiment when adjusting the volume of the reference audio signal 1830 output through the left speaker 1820 and the right speaker 1821 to be low, the probability of misrecognition of audio signals may be reduced. Accordingly, in an embodiment of the disclosure, the additional input 1900 may include a content "please, adjust the volume of the electronic device to 5 or less and input Bixby". The content of the additional input 1900 is not limited to "please, adjust the volume of the electronic device to 5 or less and input Bigsby", and may include "please, put the electronic device on mute and say Bixby", but is not limited thereto.

In an embodiment of the disclosure, the additional input 1900 may include a UI 1910 related to the additional input 1900 including the content "please, adjust the volume of the electronic device to 5 or less and input Bigsby". The electronic device 1200 may output the UI 1910 related to the additional input 1900 through the display. Furthermore, the electronic device 1200 may transmit a control signal to output the UI 1910 related to the additional input 1900 through a display of an external electronic device, but is not limited thereto. Moreover, the additional input 1900 may refer to an audio signal 1911 related to the additional input 1900 including the content "please, adjust the volume of the electronic device to 5 or less and input Bigsby". The electronic device 1200 may output the audio signal 1911 related to the additional input 1900 through the audio output, but is not limited thereto.

Figure 10:
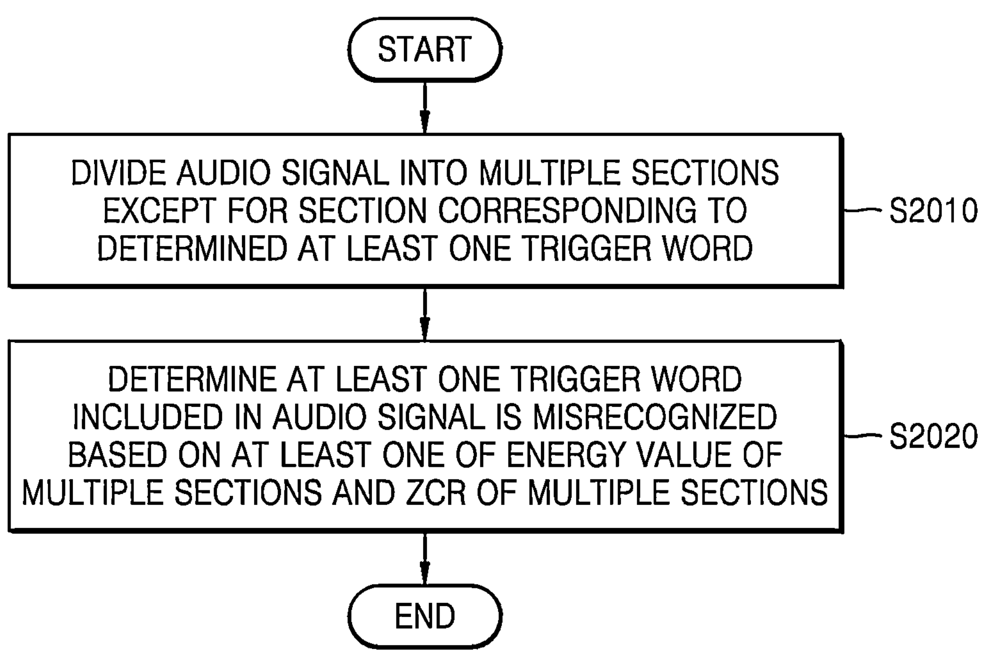
FIG. 10 is a flowchart for processing a misrecognized audio signal, according to an embodiment of the disclosure.

FIG. 10 is a flowchart for determining whether a trigger word is misrecognized based on whether at least one input signal is included in an audio signal in addition to at least one trigger word included in the audio signal, according to an embodiment.

In an embodiment of the disclosure, the electronic device 1200 may receive a continuous audio signal including at least one input signal in addition to at least one trigger word included in the audio signal. In general, the user 1100 has a tendency to utter one of the at least one trigger word first and with a certain time gap, utter a command related to audio recognition. However, the electronic device 1200 may seamlessly receive everyday conversation along with the preset trigger word, and the audio signal played by an external electronic device, or the user may sometimes utter an audio signal of a long sentence fast without a pause. In this case, the electronic device 120 may even receive a continuous audio signal including not only the at least one trigger word but also at least one input signal. In this case, as the electronic device 120 receives the continuous audio signal including not only the at least one trigger word but also at least one input signal, it may determine that misrecognition of the trigger word included in the audio signal is made.

The electronic device according to an embodiment of the disclosure may determine whether the at least one trigger word included in the audio signal is misrecognized, based on whether at least one input signal is included in the audio signal in addition to the at least one trigger word included in the audio signal. The operation of determining whether the at least one trigger word included in the audio signal is misrecognized based on whether at least one input signal is included in the audio signal in addition to the at least one trigger word included in the audio signal may include operation S2010.

In operation S2010, the electronic device may divide the audio signal into multiple sections except for a section corresponding to the at least one trigger word included in the audio signal.

In an embodiment of the disclosure, the operation of the electronic device to divide the audio signal into multiple sections except for a section corresponding to the at least one trigger word included in the audio signal may include additionally searching the audio signal for input signals before or after the section corresponding to the at least one trigger word included in the audio signal. Specifically, the electronic device may divide the audio signal into a section before the section corresponding to the at least one trigger word included in the audio signal and a section after the section corresponding to the at least one trigger word included in the audio signal.

In operation S2020, the electronic device may determine whether the at least one trigger word included in the audio signal is misrecognized based on at least one of energy values of the multiple sections and ZCRs of the multiple sections.

In an embodiment of the disclosure, the electronic device may determine at least one section related to misrecognition of the at least one trigger word included in the audio signal based on the energy values of the multiple sections. For example, the electronic device may determine at least one section having an energy value being equal to or greater than a preset threshold as at least one section related to misrecognition among the energy values of the multiple sections. As the determined at least one section has an energy value equal to or greater than the preset threshold, the electronic device may determine that there is an input signal other than the trigger word in the determined at least one section.

Furthermore, for example, the electronic device may determine at least one section having a ZCR equal to or greater than a preset threshold among ZCRs of the multiple sections. The ZCR may represent the number of times when the signal crosses 0 per hour. For example, the electronic device may determine at least one section having a ZCR equal to or greater than the preset threshold as at least one section related to misrecognition among the ZCRs of the multiple sections. As the determined at least one section has a ZCR equal to or greater than the preset threshold, the electronic device may determine that there is an input signal other than the trigger word in the determined at least one section.

However, the method of determining at least one section related to misrecognition of at least one trigger word included in an audio signal is not limited to using energy values of multiple sections or ZCRs of the multiple sections. For example, at least one section related to misrecognition of at least one trigger word included in the audio signal may be determined based on the magnitude of peak values of the multiple sections.

The electronic device according to an embodiment of the disclosure may determine that the at least one trigger word included in the audio signal is misrecognized, when it is determined that there is an input signal other than the trigger word is included in the audio signal. As the at least one input signal determined to be included in the audio signal may be located before or after the trigger word included in the audio signal, the processor 1220 of the electronic device 1200 may request an additional input related to whether to perform the at least one input signal included in the audio signal based on the determining of misrecognition of the at least one trigger word included in the audio signal. A specific operation of requesting the additional input related to FIG. 10 will be described in connection with FIGS. 11 and 12.

Figure 11:
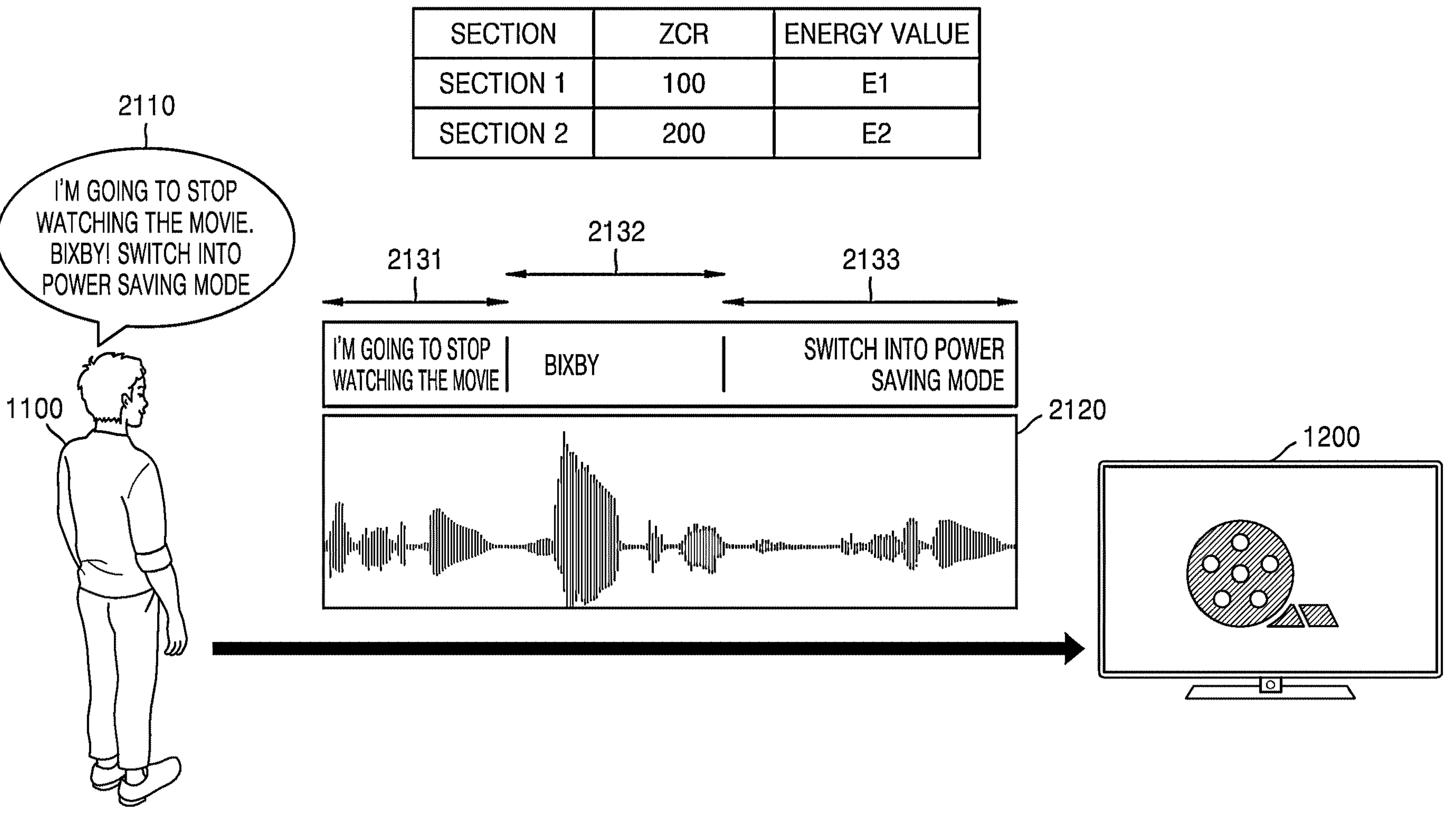
FIG. 11 is a diagram illustrating a method for processing a misrecognized audio signal, according to an embodiment of the disclosure.

FIG. 11 is a diagram for describing an example of a method of determining whether a trigger word is misrecognized based on whether at least one input signal is included in an audio signal in addition to at least one trigger word included in the audio signal, according to an embodiment.

In an embodiment of the disclosure, the user 1100 may utter an audio signal 2110 "I'm going to stop watching the movie. Bixby, switch into the power saving mode", which includes a trigger word 'Bixby'. Specifically, the user 1100 may continuously utter the audio signal 2110 "I'm going to stop watching the movie. Bixby, switch into the power saving mode" without a pause between syllables.

In an embodiment of the disclosure, the electronic device 1200 may receive, through the receiver, the audio signal 2110 "I'm going to stop watching the movie. Bixby, switch into the power saving mode" as a continuous audio signal having a long sentence as in a graph 2120 of audio recognition.

For example, the electronic device 1200 may divide the audio signal "I'm going to stop watching the movie. Bixby, switch into the power saving mode" into a section 2132 including the trigger word "Bixby" included in the audio signal, a section 2131 including "I'm going to stop watching the movie" and a section 2133 including "switch into the power saving mode". The section 2131 including "I'm going to stop watching the movie" may be uttered before the section 2132 including "Bixby" in the audio signal 2110. The section 2133 including "switch into the power saving mode" may be uttered after the section 2132 including "Bixby" in the audio signal 2110.

In an embodiment of the disclosure, the electronic device 1200 may determine "I'm going to stop watching the movie, Bixby" as a continuous audio signal when a time gap between the section 2132 including "Bixby" and the section 2131 including "I'm going to stop watching the movie" is equal to or less than a preset threshold, but the disclosure is not limited thereto. Furthermore, the electronic device 1200 may determine "Bixby, switch into the power saving mode" as a continuous audio signal when the time gap between the section 2132 including the trigger word "Bixby" and the section 2133 including "switch into the power saving mode" is equal to or less than the preset threshold, but the disclosure is not limited thereto.

In an embodiment of the disclosure, the electronic device 1200 may determine at least one section determined to have an input signal among the multiple sections based on a ZCR of the section 2131 including "I'm going to stop watching the movie" and a ZCR of the section 2133 including "switch into the power saving mode". Accordingly, the electronic device 1200 may determine that the input signal in the determined at least one section is included in the audio signal, and determine that at least one trigger word included in the audio signal is misrecognized.

Furthermore, in an embodiment of the disclosure, the electronic device 1200 may determine at least one section determined to have an input signal among the multiple sections based on an energy value of the section 2131 including "I'm going to stop watching the movie" and an energy value of the section 2133 including "switch into the power saving mode". Accordingly, the electronic device 1200 may determine that the input signal in the determined at least one section is included in the audio signal, and determine that at least one trigger word included in the audio signal is misrecognized.

Specifically, according to the example of FIG. 11, as the ZCR, 100 and the energy value, E1 of the section 2131 including "I'm going to stop watching the movie" are lower than the preset thresholds, the electronic device 1200 may not determine that "I'm going to stop watching the movie" is an input signal related to the misrecognition. On the other hand, as the ZCR, 200 and the energy value, E2 of the section 2133 including "switch into the power saving mode" are at least the preset thresholds, the electronic device 1200 may determine that "switch into the power saving mode" is an input signal related to the misrecognition. In this case, as compared to "I'm going to stop watching the movie", "switch into the power saving mode" may correspond to a signal having a relatively high energy value or ZCR, without being limited thereto.

Figure 12:
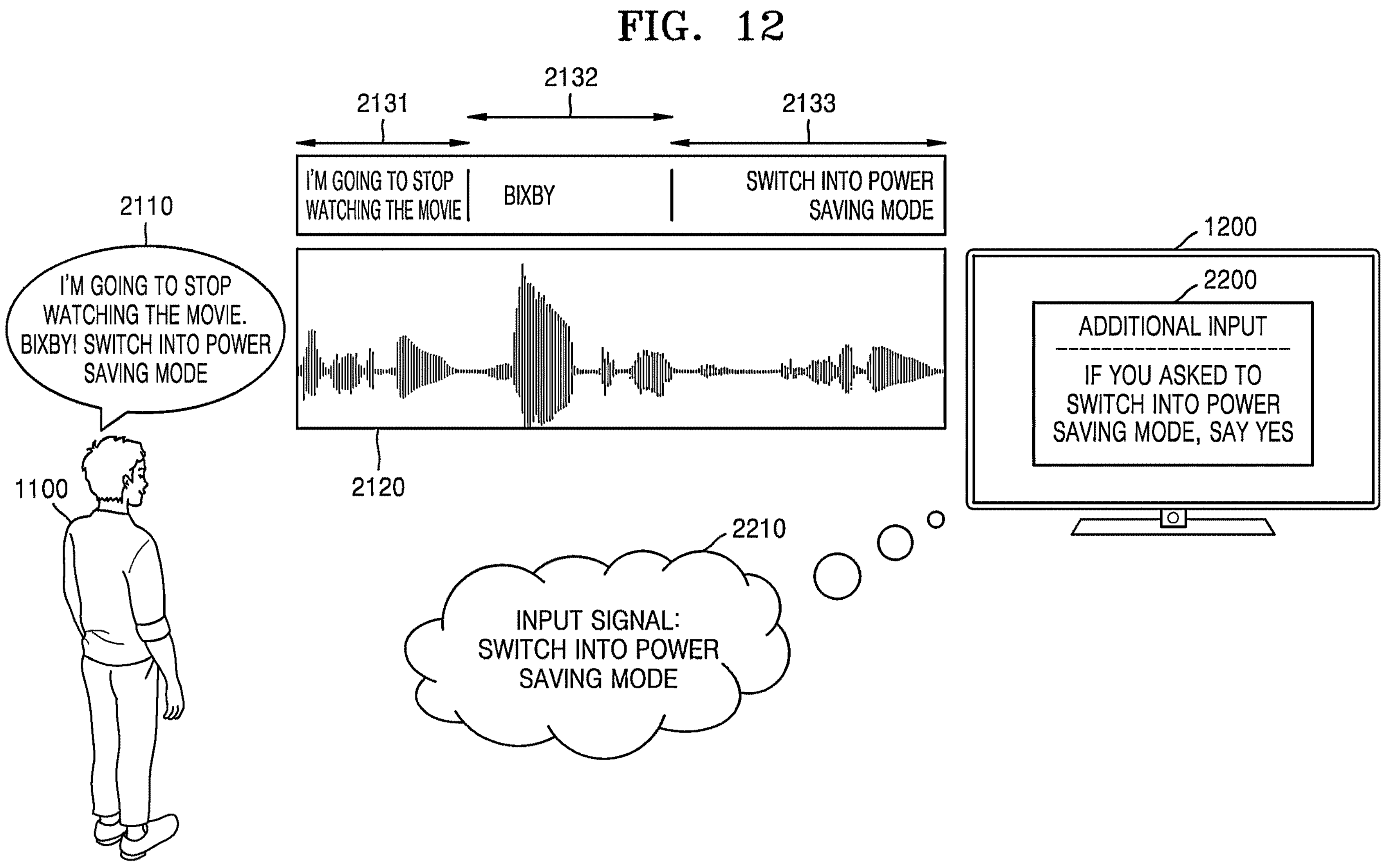
FIG. 12 is a diagram of an embodiment of additional inputs from a user according to FIG. 11.

FIG. 12 is a diagram of an embodiment of additional inputs from a user according to FIG. 11.

In an embodiment of the disclosure, the electronic device 1200 may determine that there is misrecognition for the preset trigger word 'Bixby' determined as being included in an audio signal 2110 "I'm going to stop watching the movie, Bixby, switch into the power saving mode" due to continuous audio signal reception. In this case, the electronic device 1200 may determine that at least one trigger word included in the audio signal is misrecognized because of reception of the continuous audio signal, and may request an additional input about whether to perform the input signal.

In an embodiment of the disclosure, the input signal "switch into the power saving mode" in addition to the trigger word 'Bixby' may be included in the audio signal 2110 of the user 1100, "I'm going to stop watching the movie, Bixby, switch into the power saving mode". For example, as described above in connection with FIG. 11, based on the ZCR, 200 of the section 2133 including "switch into the power saving mode" and the energy value E2 of the section 2133 including "switch into the power saving mode", the electronic device 1200 may determine "switch into the power saving mode" as an input signal 2210.

In an embodiment of the disclosure, the electronic device 1200 may request an additional input about whether to perform the input signal 2210 "switch into the power saving mode" from the user 1100. Specifically, the electronic device 1200 may output an additional input 2200 including "if you asked to switch into the power saving mode, say yes" in a UI form through the display. Furthermore, the electronic device 1200 may output the additional input 2200 including "if you asked to switch into the power saving mode, say yes" in the form of an audio signal through the audio output, but the disclosure is not limited thereto.

In an embodiment of the disclosure, when receiving an additional input of the user within a preset time in response to the additional input request, the electronic device 1200 may execute the function corresponding to the audio recognition based on the user's additional input and audio signal. For example, when the user 1100 responds with yes within the preset time in response to the additional input request "if you asked to switch into the power saving mode, say yes", the electronic device 1200 may determine that there is no misrecognition on the at least one trigger word 'Bixby' included in the audio signal 2110 of the user 1100.

In an embodiment of the disclosure, the electronic device 1200 may receive an audio signal 'yes' related to confirmation of the user 1100 of whether to perform the input signal 2210 "switch into the power saving mode", and the electronic device 1200 may perform the user's command "switch into the power saving mode" without an operation of performing additional audio recognition through the STT engine, but the disclosure is not limited thereto. For example, when the input signal is not an audio signal related to the command, the electronic device 1200 may start audio recognition on the audio signal based on the user's additional input received in response to the request.

Furthermore, in an embodiment of the disclosure, when the user 1100 responds with 'no' or rejects answer within the preset time in response to the additional input request "if you asked to switch into the power saving mode, say yes", the electronic device 1200 may terminate audio recognition on the audio signal 2110. In this case, the electronic device 1200 may operate in a standby mode until receiving a new audio signal.

Figure 13:
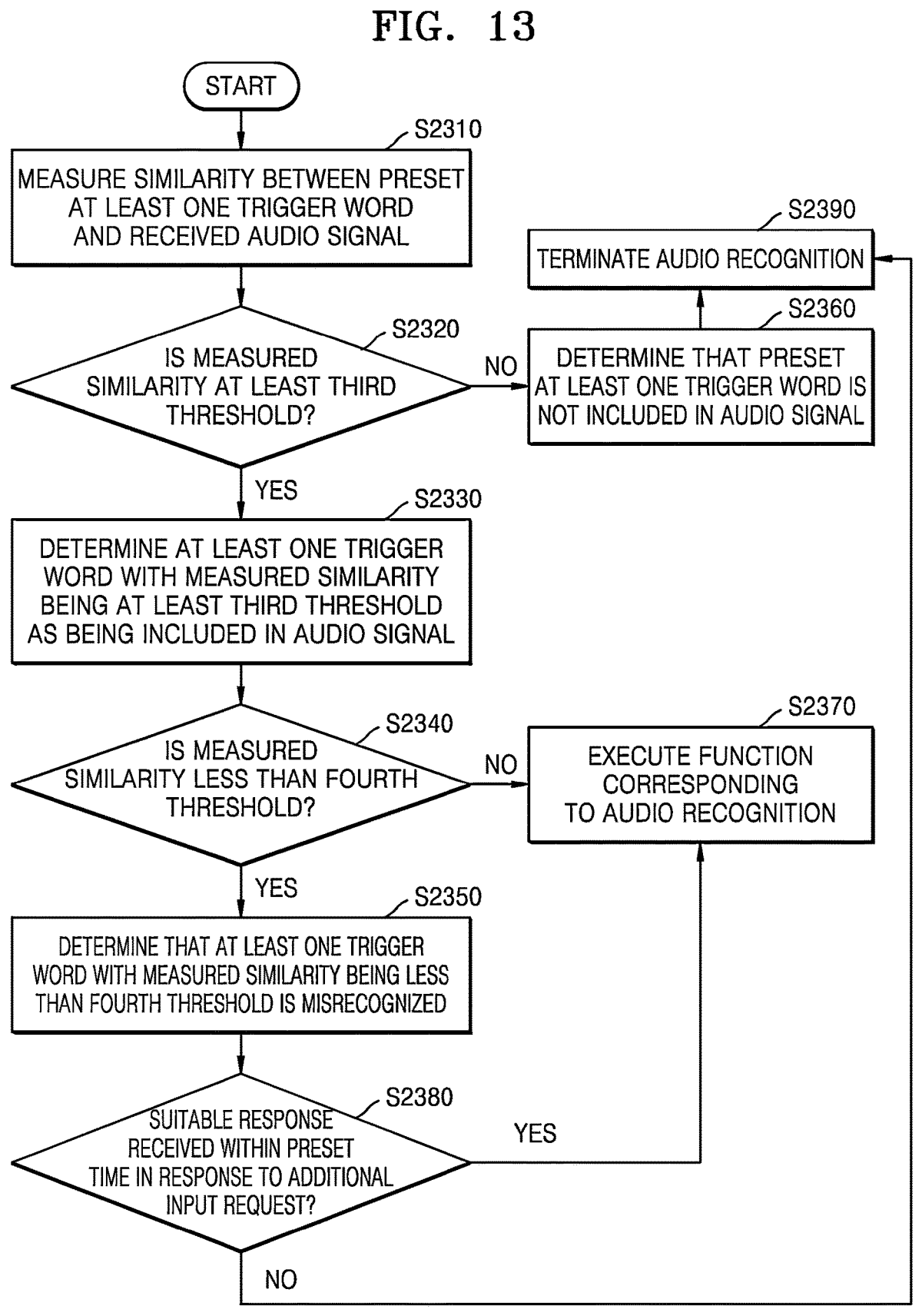

FIG. 13 is a flowchart for determining whether a trigger word is misrecognized based on similarity between preset at least one trigger word and a received audio signal, according to an embodiment.

In operation S2310, in an embodiment of the disclosure, the electronic device may measure similarity between the preset at least one trigger word and the received audio signal.

In operation S2320, in an embodiment of the disclosure, the electronic device may determine whether the preset at least one trigger word is included in the audio signal based on whether the similarity between the preset at least one trigger word and the received audio signal is equal to or greater than a third threshold.

In an embodiment of the disclosure, the electronic device 1200 may include a WWE, and the WWE may measure the similarity between the user's utterance and the preset at least one trigger word based on an acoustic model trained with acoustic information for the stored at least one trigger word. The measured similarity may be one determined based on probability information, and when the measured similarity is at least the preset third threshold, the electronic device 1200 may determine that the user's utterance includes the preset at least one trigger word, in operation S2330.

In an embodiment of the disclosure, the electronic device 1200 may determine that the preset at least one trigger word is not included in the audio signal when the similarity between the preset at least one trigger word and the received audio signal is less than the third threshold, in operation S2360. In this case, the electronic device may terminate audio recognition on the audio signal based on the determining that the preset at least one trigger word is not included in the audio signal, in operation S2390. In this case, the electronic device may operate in the standby mode until receiving a new audio signal.

In operation S2340, in an embodiment of the disclosure, the electronic device may determine whether the preset at least one trigger word included in the audio signal is misrecognized based on whether the similarity between the preset at least one trigger word and the received audio signal is less than a fourth threshold.

In an embodiment of the disclosure, when the similarity between the preset at least one trigger word and the received audio signal is less than the fourth threshold, the electronic device may determine that the similarity is as much as an additional input request of the user is required. The electronic device may determine that at least one trigger word, for which similarity between the preset at least one trigger word and the received audio signal is less than the fourth threshold, is misrecognized, in operation S2350. On the other hand, the electronic device may determine that at least one trigger word, for which similarity between the preset at least one trigger word and the received audio signal is at least the fourth threshold, is not misrecognized. Specifically, when the similarity between the preset at least one trigger word and the received audio signal is at least the fourth threshold, the electronic device 1200 may determine that the similarity is as much as it is fine to execute the function corresponding to the audio recognition without requesting an additional input from the user. Hence, the electronic device may execute the function corresponding to the audio recognition based on the audio signal without a request for an additional input from the user, in operation S2370.

In operation S2380, in an embodiment of the disclosure, as the electronic device determines that at least one trigger word, for which similarity between the preset at least one trigger word and the received audio signal is less than the fourth threshold, is misrecognized, it may request an additional input from the user. The electronic device may execute the function corresponding to the audio recognition on the audio signal based on whether a suitable answer is received from the user within a preset time in response to the request for the additional input.

In an embodiment of the disclosure, the electronic device may request an additional input from the user within the preset time. For example, when the user responds with a suitable answer within the preset time in response to the request, the electronic device 1200 may execute the function corresponding to the audio recognition, in operation S2370. On the other hand, when the user does not respond with the suitable answer or does not respond within the preset time in response to the request, the electronic device 1200 may terminate the audio recognition in operation S2390. In this case, the electronic device may operate in the standby mode until receiving a new audio signal.

FIG. 14 is a diagram for describing an example of a method of determining based on similarity between preset at least one trigger word and a received audio signal whether a trigger word included in the audio signal is misrecognized, according to an embodiment.

In an embodiment of the disclosure, the user 1100 may utter an audio signal 2410, "biona? (the Korean version of 'is it raining?') Bixby! How is the weather?". The electronic device 1200 may receive the audio signal 2410 of the user 1100 through the receiver. In FIG. 14, the audio signal 2410 may not be a continuous audio signal unlike the audio signal 2110 of FIG. 11 because there are time gaps between "biona?", "Bixby" and "how is the weather?", but is not limited thereto.

In an embodiment of the disclosure, the electronic device 1200 may measure similarity between the received audio signal 2410 of the user 1100 and the preset trigger word. For example, similarity between the received audio signal 2410 of the user 1100 and the preset trigger word, which is measured over time, may be obtained as in a graph 2440 of FIG. 14. The similarity between the received audio signal 2410 of the user 1100 and the preset trigger word may be measured with consideration for the peak value, the distribution, the energy value, etc., of the signal, without being limited thereto.

In an embodiment of the disclosure, the graph 2440 may represent similarity over time between the audio signal 2410 of the user 1100 and the preset trigger word. A system threshold $Th_{system}$ may be a value corresponding to the third threshold in FIG. 13, and may be used to determine whether the preset at least one trigger word is included in the audio signal. An additional input request threshold $Th_{add}$ may be a value corresponding to the fourth threshold in FIG. 13, and may be used to determine that at least one trigger word included in the audio signal is misrecognized. The system threshold $Th_{system}$ and the additional input request threshold $Th_{add}$ are preset thresholds, which may be stored in the memory and may be adaptively adjusted by the user 1100 or a server. Specifically, the system threshold $Th_{system}$ may be preset to 0.28 and the additional input request threshold $Th_{add}$ may be preset to 0.35, but they are not limited thereto.

In an embodiment of the disclosure, the audio signal 2410 may include a first section 2451, "biona?", a second section 2452, "Bixby!" and a third section 2453, "how is the weather?".

For example, in the case of the first section 2451, "biona?", it is similar to the trigger word 'Bixby' in terms of the number of letters and first syllables [bi] and [big], so a maximum value of the similarity between "biona?" and the preset trigger word may be measured to be 0.25. The maximum value 0.25 of the similarity between "biona?" and the preset trigger word may be smaller than the system threshold $Th_{system}$, 0.28. Hence, the electronic device 1200 may determine that "biona?" and 'bixby' of the preset at least one trigger word are different, and determine that the preset at least one trigger word, 'Bixby' is not included in the first section 2451.

Even when the preset at least one trigger word is uttered, there may be a need for an additional input sometimes depending on the pronunciation of the user 1100, audio information of the surrounding environment, etc. For example, in the case of the second section 2452, "Bixby!", it is the same as the trigger word 'Bixby' so a maximum value of the similarity between "Bixby!" and the preset trigger word 'bixby' may be measured to be 0.32. The maximum value 0.32 of the similarity between "Bixby!" in the second section 2452 and the preset trigger word 'Bixby' may be measured as being larger than the system threshold $Th_{system}$, but smaller than the additional input request threshold $Th_{add}$. Hence, the electronic device 1200 may determine that there is misrecognition of the audio signal 2410, and request an additional input from the user 1100.

Furthermore, in the case of the first section 2453, "how is the weather?", it is different from the trigger word 'Bixby' in terms of the number of letters and first syllables [ha] and [big], so a maximum value of the similarity between "how is the weather?" and the preset trigger word may be measured to be 0.15. The maximum value 0.15 of the similarity between "how is the weather?" and the preset trigger word 'Bixby' may be smaller than the system threshold $Th_{system}$, 0.28. Hence, the electronic device 1200 may determine that "how is the weather?" and 'bixby' of the preset at least one trigger word are different, and determine that the preset at least one trigger word, 'Bixby' is not included in the first section 2451.

Accordingly, the maximum value, 0.32, of the similarity between "Bixby" in the second section 2452 and the preset trigger word 'Bixby' is larger than the system threshold $Th_{system}$ but smaller than the additional input request threshold $Th_{add}$, so the electronic device 1200 may determine that there is misrecognition on the audio signal 2410 and request an additional input from the user 1100.

Figure 15:
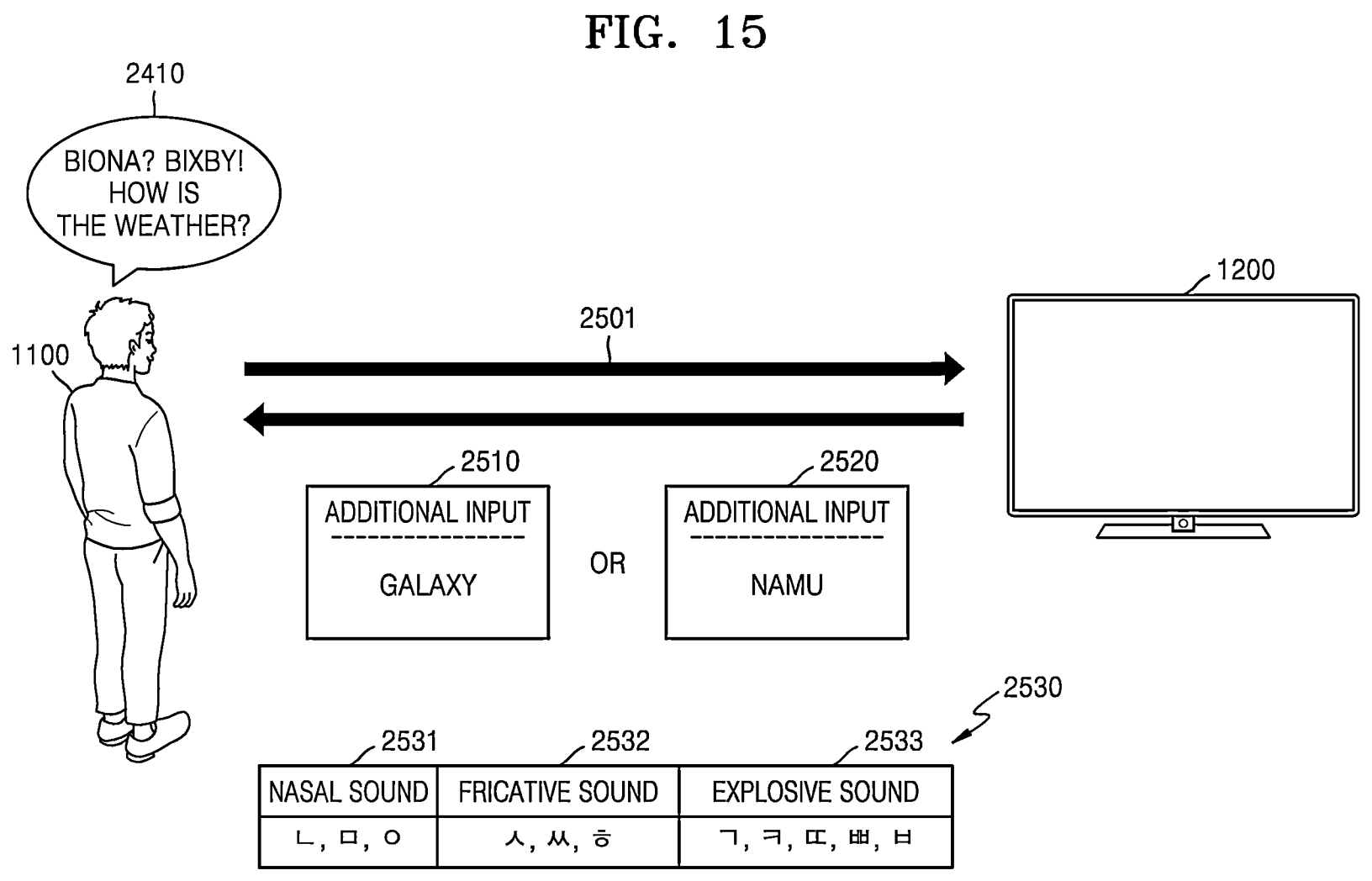

FIG. 15 is a diagram of an embodiment of additional inputs from a user according to FIG. 14.

In an embodiment of the disclosure, the electronic device 1200 may request an additional input from the user 1100 based on the determining that the at least one trigger word 'Bixby' included in the audio signal is misrecognized as being included in the audio signal 2410 of the user 1100. For example, the electronic device 1200 may output an additional input in the form of a UI through the display.

In an embodiment of the disclosure, an additional input 2510 may be a UI including a random keyword 'galaxy' generated through a random keyword generator of the electronic device 1200. The user 1100 may have a bad pronunciation of the preset at least one keyword 'Bixby', and the electronic device 1200 may not correctly receive an audio signal of the user 1100 due to surrounding noise. Hence, the electronic device 1200 may generate a random keyword and request the user 1100 to utter the word 'galaxy' different from 'Bixby'. The electronic device 1200 may request the additional input 2510 from the user through at least one of the display or the audio output, without being limited thereto.

The electronic device 1200 may request utterance of the randomly generated 'galaxy' within a preset time to determine whether to perform audio recognition on the audio signal 2410 of the user 1100. When the user 1100 utters 'galaxy' within the preset time, the electronic device 1200 may execute a function corresponding to audio recognition on the audio signal 2410 of the user 1100. On the other hand, when the user 1100 does not utter 'galaxy' or rejects answer within a preset second time, the electronic device 1200 may terminate audio recognition on the audio signal 2410 of the user 1100. In this case, the electronic device 1200 may operate in a standby mode until receiving a new audio signal.

In an embodiment of the disclosure, an additional input 2520 may be a UI including a keyword 'namu (the Korean version of tree) generated through a pronunciation keyword generator of the electronic device 1200. Specifically, the electronic device 1200 may select a keyword 'namu' which is different in pronunciation structure from the preset at least one trigger word 'Bixby' through the display. The electronic device 1200 may output the additional input 2520 in a UI that requests the user to additionally input the keyword 'namu' selected through the display. The electronic device 1200 may request the additional input 2510 from the user through at least one of the display and the audio output, without being limited thereto.

Specifically, the electronic device 1200 may include pronunciation information 2530 in selecting the keyword 'namu', which is different in pronunciation structure from the preset at least one trigger word 'Bixby'. For example, consonants of 'Bixby' belong to fricative sound 2532 or explosive sound 2533, and all the consonants of 'namu' belong to nasal sound 2531, so the electronic device 1200 may determine that 'namu' and 'Bixgy' are differently pronounced keywords.

The electronic device 1200 may request utterance of the selected keyword 'namu' within a preset time to determine whether to perform audio recognition on the audio signal 2410 of the user 1100. When the user 1100 utters 'namu' within the preset time, the electronic device 1200 may execute a function corresponding to audio recognition on the audio signal 2410 of the user 1100. On the other hand, when the user 1100 does not utter 'namu' or rejects answer within the preset time, the electronic device 1200 may terminate audio recognition on the audio signal 2410 of the user 1100. In this case, the electronic device 1200 may operate in a standby mode until receiving a new audio signal.

A method according to an embodiment of the disclosure may be stored in a machine-readable storage medium, which may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a machine-readable storage medium (e.g., a CD-ROM) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

Several embodiments have been described, but a person of ordinary skill in the art will understand and appreciate that various modifications can be made without departing the scope of the disclosure. Thus, it will be apparent to those of ordinary skill in the art that the disclosure is not limited to the embodiments described, but can encompass not only the appended claims but the equivalents. For example, an element described in the singular form may be implemented as being distributed, and elements described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

What is claimed is:

1. A method of processing a misrecognized audio signal in an electronic device, the method comprising:

receiving an audio signal;

detecting that at least one preset trigger word is included in the received audio signal;

after detecting that the at least one preset trigger word is included in the received audio signal, determining, by a processor of the electronic device, whether the detected trigger word is misrecognized by measuring, by a wake-up word engine executed by the processor, a similarity between the at least one preset trigger word and the received audio signal based on frequency components extracted from the received audio signal, wherein the wake-up word engine comprises an acoustic model trained with acoustic information for the preset at least one trigger word;

based on determining that the detected trigger word is misrecognized, requesting an additional input from a user; and based on the additional input from the user received in response to the requesting and the received audio signal, controlling, by the electronic device, whether to execute a function corresponding to audio recognition or to terminate the audio recognition.

2. The method of claim 1, wherein the determining of whether the at least one preset trigger word included in the audio signal is misrecognized is based on a history of execution of the function corresponding to the audio recognition within a preset first time.

3. The method of claim 1, wherein the determining of whether the at least one preset trigger word included in the audio signal is misrecognized is based on there being no history of execution of the function corresponding to the audio recognition within a preset first time.

4. The method of claim 1, wherein the determining of whether the at least one preset trigger word included in the audio signal is misrecognized comprises:

synchronizing the received audio signal and a reference audio signal output from another electronic device; and determining that the at least one preset trigger word included in the audio signal is misrecognized when a similarity between the synchronized audio signal and the synchronized reference audio signal is greater than or equal to a preset first threshold.

5. The method of claim 4, wherein the requesting of the additional input from the user comprises:

adjusting an intensity of the reference audio signal to less than or equal to a preset second threshold; and requesting the additional input for the at least one preset trigger word from the user.

6. The method of claim 1, wherein the determining that the at least one preset trigger word included in the audio signal is misrecognized is based on the received audio signal comprising at least one input signal in addition to the at least one preset trigger word.

7. The method of claim 6, wherein the requesting the additional input from the user comprises requesting, from the user, another additional input related to whether to perform the at least one input signal included in the audio signal.

8. The method of claim 6, wherein the determining that the at least one preset trigger word is misrecognized comprises:

dividing the audio signal into multiple sections, wherein the multiple sections do not comprise a section corresponding to the at least one preset trigger word; and determining whether the at least one preset trigger word included in the audio signal is misrecognized based on at least one of: energy values of the multiple sections or zero-crossing rates (ZCRs) of the multiple sections.

9. The method of claim 1, wherein the determining that the at least one preset trigger word is misrecognized comprises:

determining that the at least one preset trigger word has the measured similarity that is greater than or equal to a third threshold.

10. The method of claim 9, wherein when more than one preset trigger words have a corresponding measured similarity that is greater than or equal to the third threshold, the determining that the at least one preset trigger word is misrecognized comprises:

determining that a word, among the more than one preset trigger words having the corresponding measured similarity greater than or equal to the third threshold, has the corresponding measured similarity that is smaller than a fourth threshold.

11. An electronic device for processing a misrecognized audio signal, the electronic device comprising:

a memory storing one or more instructions; and at least one processor configured to execute the one or more instructions, wherein the at least one processor is configured to:

detect that based on at least one preset trigger word is included in the received audio signal, after detecting that the at least one preset trigger word is included in a received audio signal, determine whether the detected trigger word is misrecognized by measuring, by a wake-up word engine executed by the at least one processor, a similarity between the at least one preset trigger word and the received audio signal based on frequency components extracted from the received audio signal, wherein the wake-up word engine comprises an acoustic model trained with acoustic information for the preset at least one trigger word, based on determining that the detected trigger word is misrecognized, request an additional input from a user; and based on the additional input from the user received in response to the request and the received audio signal, control whether to execute a function corresponding to audio recognition or to terminate the audio recognition.

12. The electronic device of claim 11, wherein the at least one processor is configured to determine that the at least one preset trigger word included in the received audio signal is misrecognized based on a history of execution of the function corresponding to the audio recognition within a preset first time.

13. The electronic device of claim 11, further comprising an audio output and a receiver, wherein the at least one processor is configured to:

synchronize the received audio signal and a reference audio signal output from the audio output, and determine that the at least one preset trigger word included in the received audio signal is misrecognized when a similarity between the synchronized audio signal and the synchronized reference audio signal is equal to or greater than a preset first threshold.

14. The electronic device of claim 11, wherein the at least one processor is configured to determine that the at least one preset trigger word included in the received audio signal is misrecognized based on the received audio signal comprising at least one input signal in addition to the at least one preset trigger word.

15. A non-transitory computer-readable medium storing instructions, that when executed by a processor, causes the processor to:

receive an audio signal;

detect that at least one preset trigger word is included in the received audio signal;

after detecting that the at least one preset trigger word is included in the received audio signal, determine whether the detected trigger word is misrecognized by measuring, by a wake-up word engine executed by the processor, a similarity between the at least one preset trigger word and the received audio signal based on frequency components extracted from the received audio signal, wherein the wake-up word engine comprises an acoustic model trained with acoustic information for the preset at least one trigger word;

based on determining that the detected trigger word is misrecognized, request an additional input from a user; and based on the additional input from the user received in response to the request and the received audio signal, control whether to execute a function corresponding to audio recognition or to terminate the audio recognition.

* * * * *